United States Patent
Jiang et al.

(10) Patent No.: US 9,585,005 B2
(45) Date of Patent: Feb. 28, 2017

(54) ENHANCED PROFILE AND MOBILITY MANAGEMENT SYSTEM (PMMS) FOR LTE ENVIRONMENT

(71) Applicant: MOBILEUM, INC., Santa Clara, CA (US)

(72) Inventors: John Yue Jun Jiang, Danville, CA (US); David Gillot, Brussels (BE)

(73) Assignee: MOBILEUM, INC., Santa Clara, CA (US)

( * ) Notice: Subject to any disclaimer, the term of this patent is extended or adjusted under 35 U.S.C. 154(b) by 0 days.

(21) Appl. No.: 14/763,743

(22) PCT Filed: Jan. 27, 2014

(86) PCT No.: PCT/US2014/013229
§ 371 (c)(1),
(2) Date: Jul. 27, 2015

(87) PCT Pub. No.: WO2014/117101
PCT Pub. Date: Jul. 31, 2014

(65) Prior Publication Data
US 2015/0341780 A1    Nov. 26, 2015

Related U.S. Application Data

(60) Provisional application No. 61/756,950, filed on Jan. 25, 2013.

(51) Int. Cl.
*H04W 4/00* (2009.01)
*H04W 8/20* (2009.01)
(Continued)

(52) U.S. Cl.
CPC ............... *H04W 8/20* (2013.01); *H04W 8/04* (2013.01); *H04W 8/12* (2013.01); *H04W 84/042* (2013.01)

(58) Field of Classification Search
CPC ........... H04W 4/02; H04W 8/02; H04W 8/04; H04W 8/06; H04W 8/12; H04W 8/18;
(Continued)

(56) References Cited

U.S. PATENT DOCUMENTS 8,644,355 B2 *   2/2014   Agarwal ............. H04L 12/1425
                                                          370/522
2010/0208725 A1   8/2010   Lahtinen et al.
(Continued)

OTHER PUBLICATIONS

International Search Report and Written Opinion of PCT/US2014/013299 dated May 14, 2014.

*Primary Examiner* — Temica M Beamer
(74) *Attorney, Agent, or Firm* — Arent Fox LLP

(57) ABSTRACT

The present invention provides systems and methods for providing additional or modified subscriber profile information of an outbound roamer of a Home Public Mobile Network (HPMN), wherein the outbound roamer is roaming in a Visited Public Mobile Network (VPMN) in an LTE environment. The system includes a monitoring block to monitor Diameter and MAP transaction messages on S6, SI and Cx interfaces. The system includes subscriber and roamer databases storing subscriber or roamer records, wherein each record comprises at least the International Mobile Subscriber Identity (IMSI) of the subscriber or roamer. The system includes a detection block to detect whether provisioning of an alternate roaming profile is required for the subscriber or roamer, and further includes a provisioning block to provision the generated alternate roaming profile of the subscriber or roamer to LTE nodes holding a subscriber or roamer profile (i.e., MME, the IM-SSF or the SCSCF).

18 Claims, 30 Drawing Sheets

Generic Method for monitoring-based PMMS implementation

(51) Int. Cl.
*H04W 8/04* (2009.01)
*H04W 8/12* (2009.01)
*H04W 84/04* (2009.01)

(58) Field of Classification Search
CPC ....... H04W 8/26; H04W 8/183; H04W 48/18; H04W 92/04
USPC .................. 455/432.1, 432.3, 433, 456.1
See application file for complete search history.

(56) References Cited

U.S. PATENT DOCUMENTS

| | | |
|---|---|---|
| 2011/0126277 A1 | 5/2011 | McCann et al. |
| 2011/0158090 A1* | 6/2011 | Riley ...................... H04L 12/14 370/230 |
| 2011/0195710 A1 | 8/2011 | Nas et al. |
| 2012/0030331 A1 | 2/2012 | Karampatsis |
| 2012/0129488 A1 | 5/2012 | Patterson et al. |
| 2013/0017827 A1 | 1/2013 | Muhanna et al. |
| 2015/0098394 A1* | 4/2015 | Corcoran ............ H04L 65/1016 370/329 |

* cited by examiner

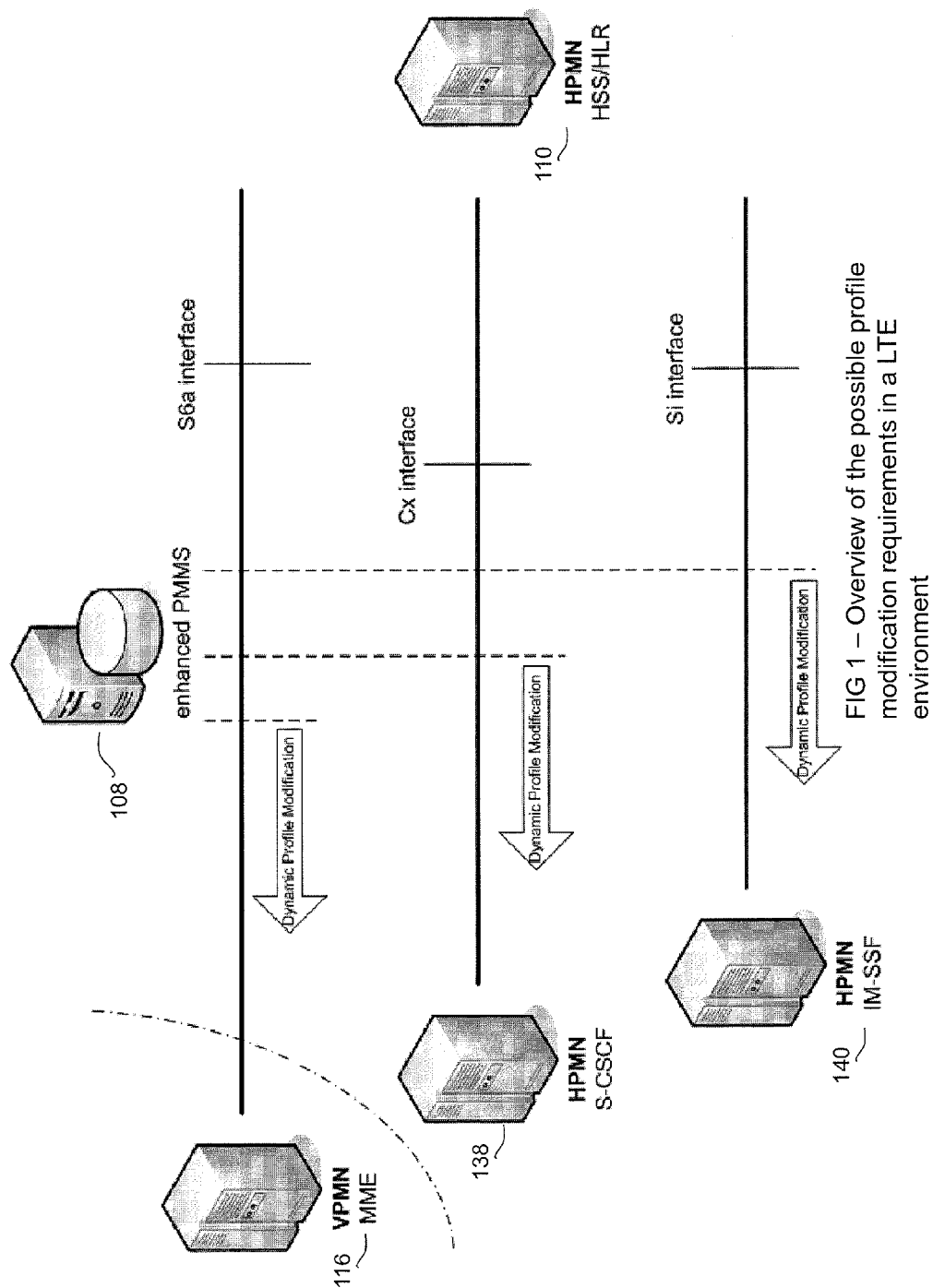
FIG 1 – Overview of the possible profile modification requirements in a LTE environment

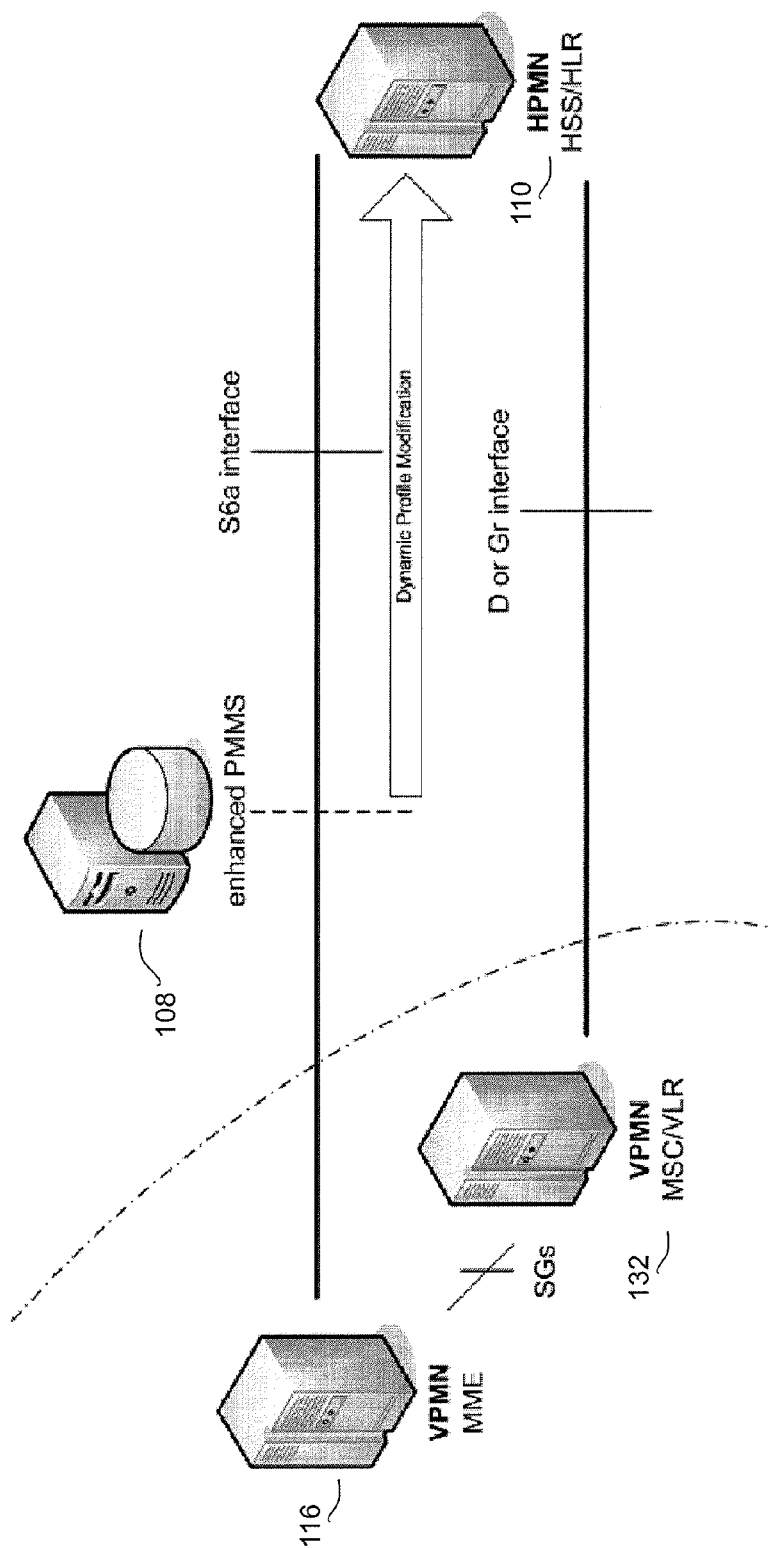
FIG 2 – Fallback to provision the HSS/HLR leading to a dynamic Profile modification at the MME, via HSS-originated signaling.

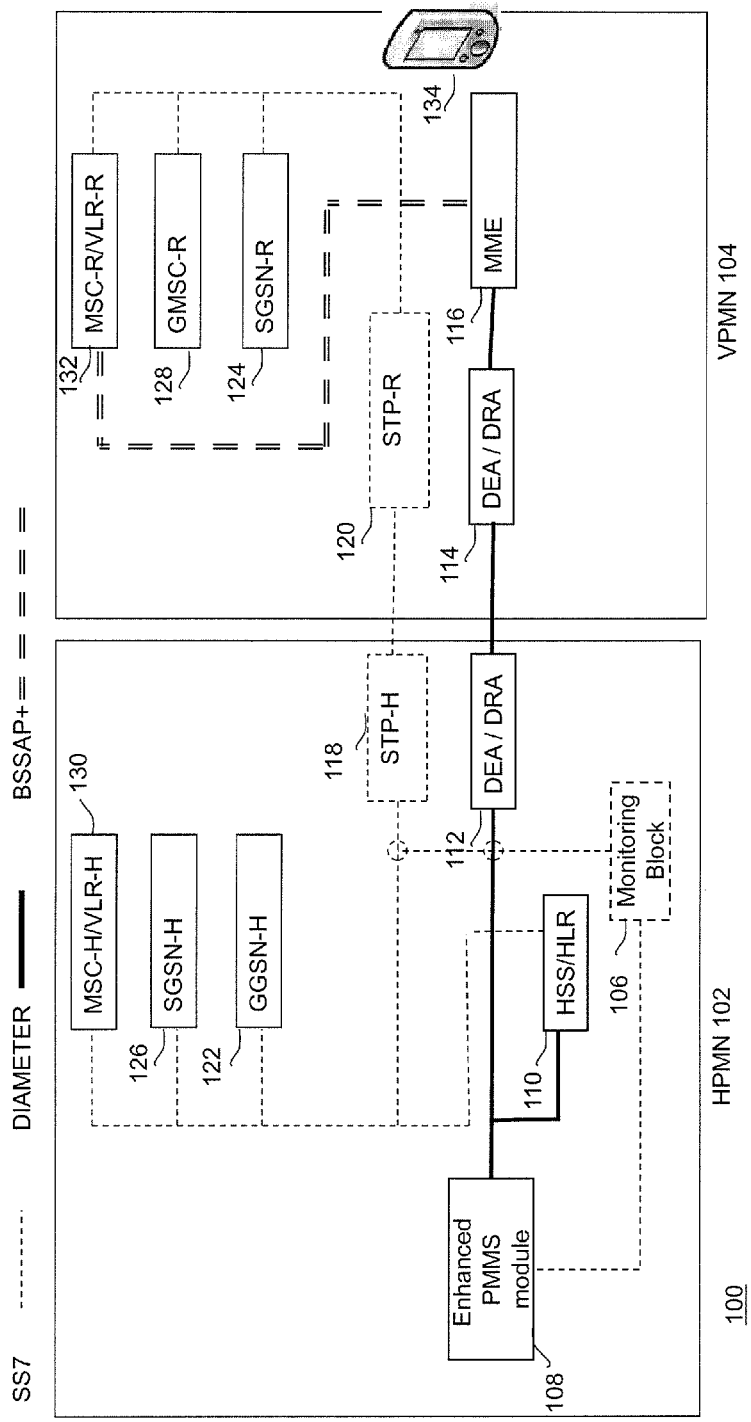
FIG 3 – Architecture for modifying the profile of an "outbound" roamer

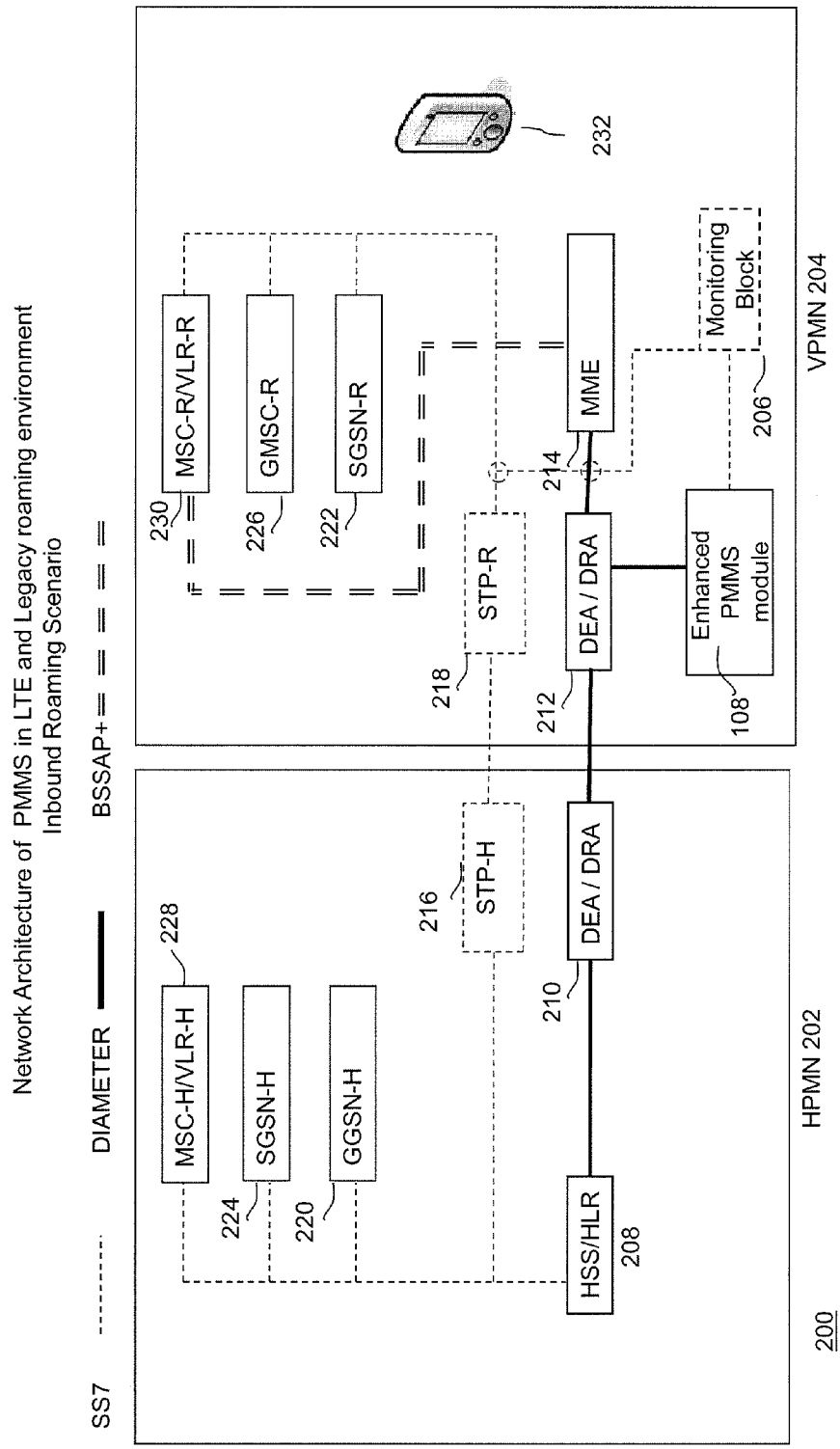
FIG 4 – Architecture for modifying the profile of an "inbound" roamer

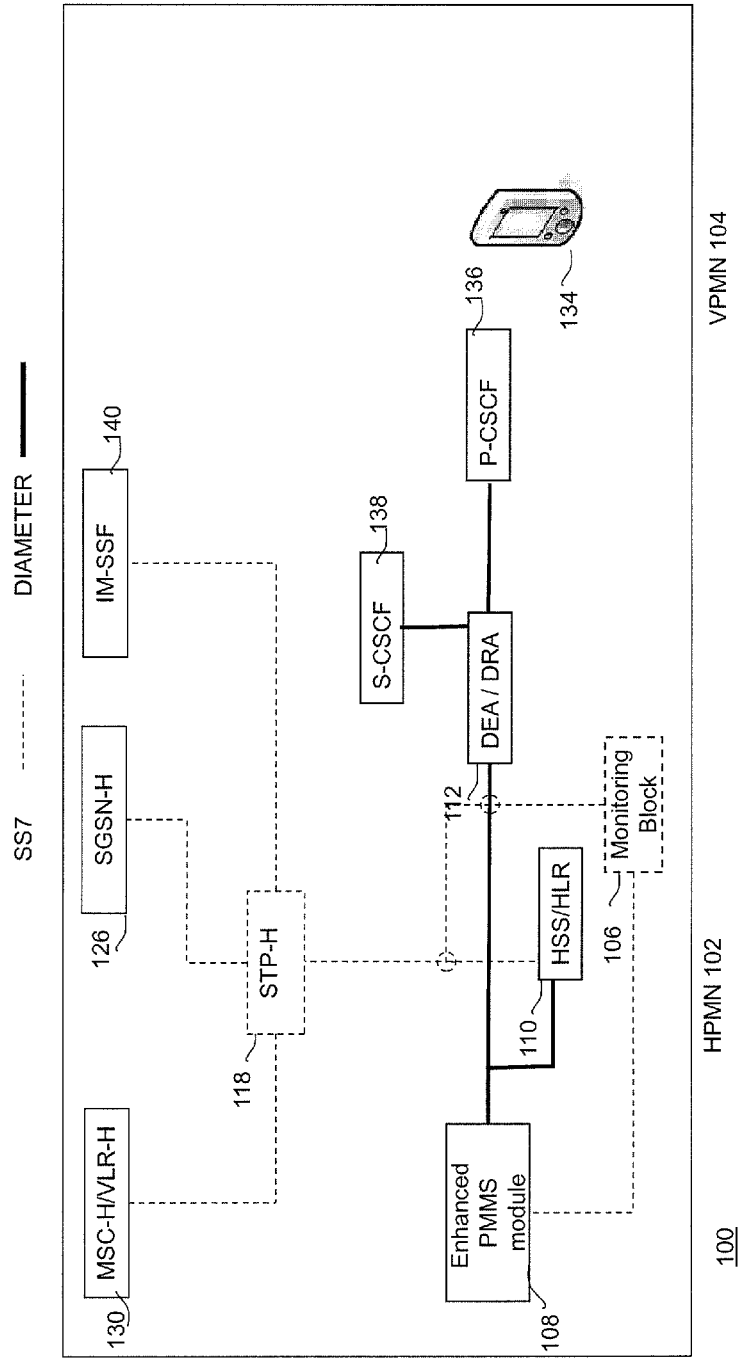
FIG 5 – Architecture for modifying the profile of a subscriber in an LTE/IMS environment

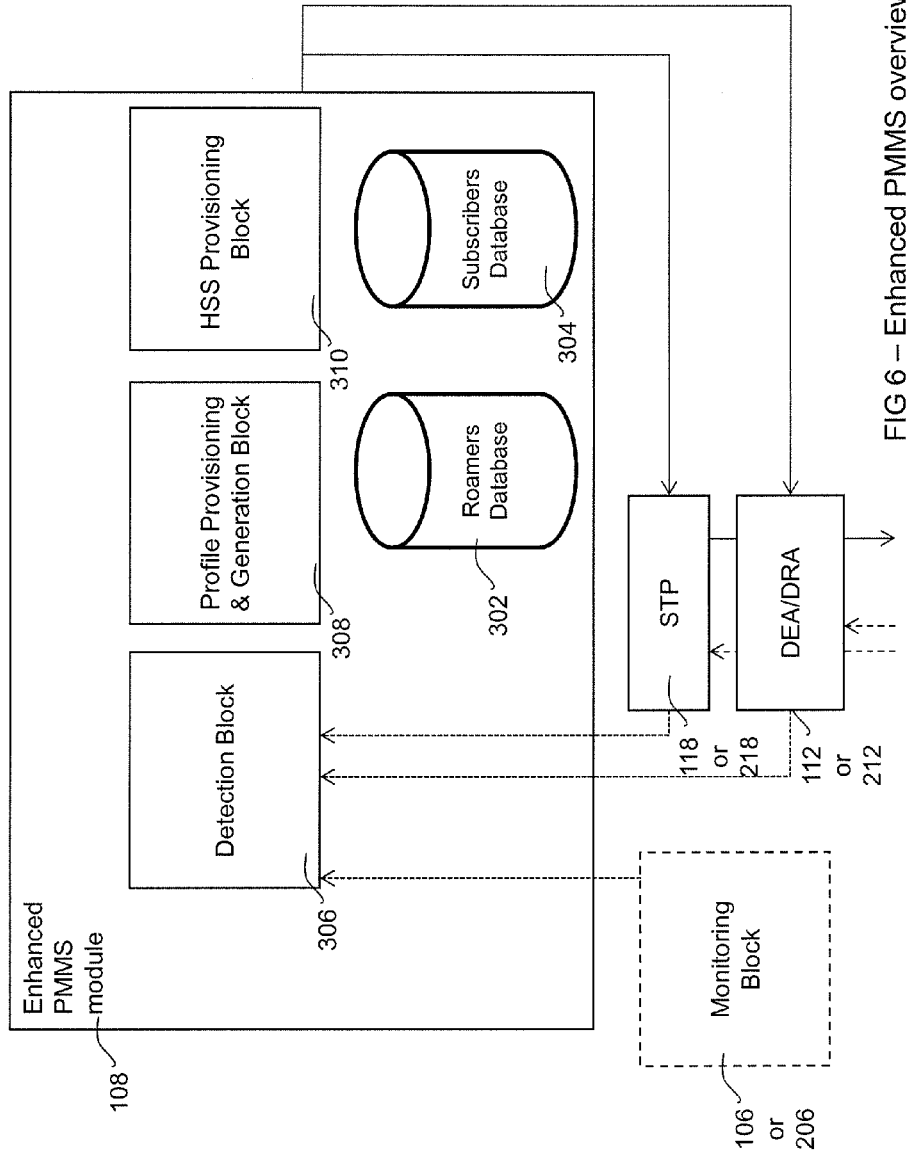
FIG 6 – Enhanced PMMS overview

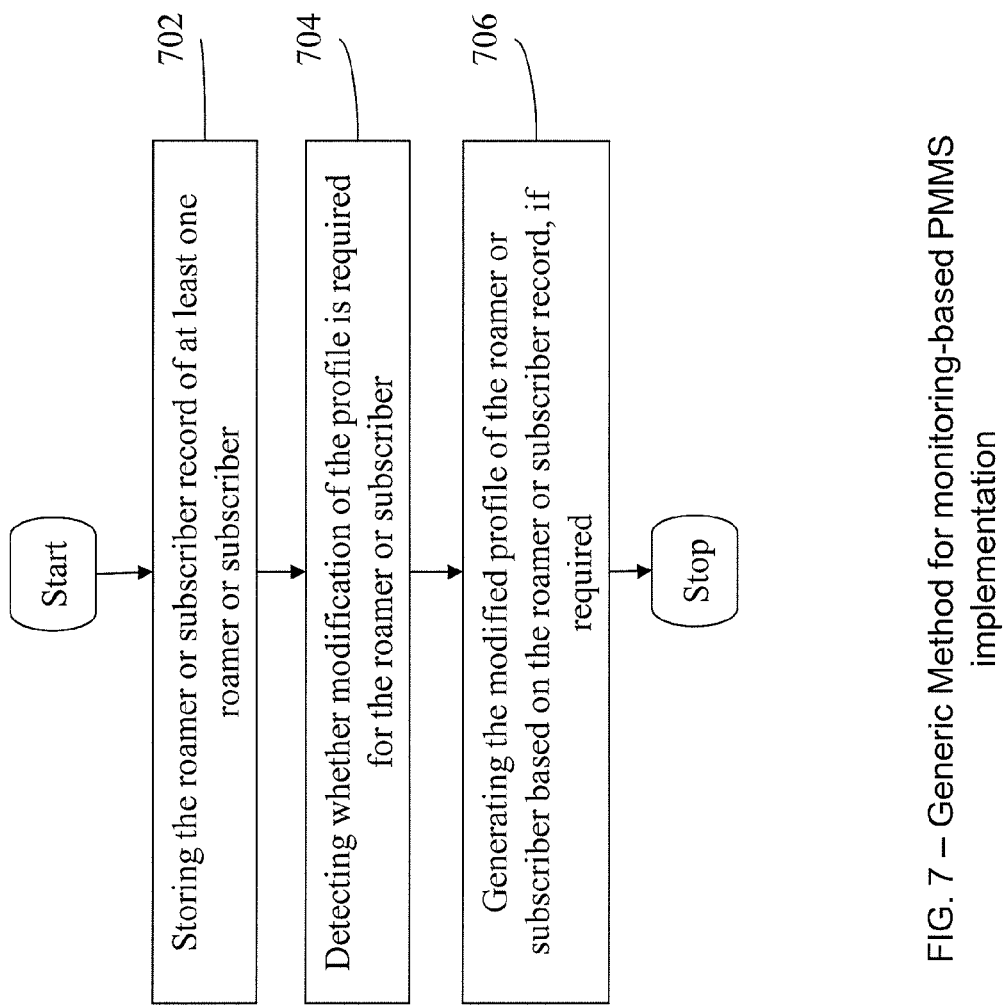
FIG. 7 – Generic Method for monitoring-based PMMS implementation

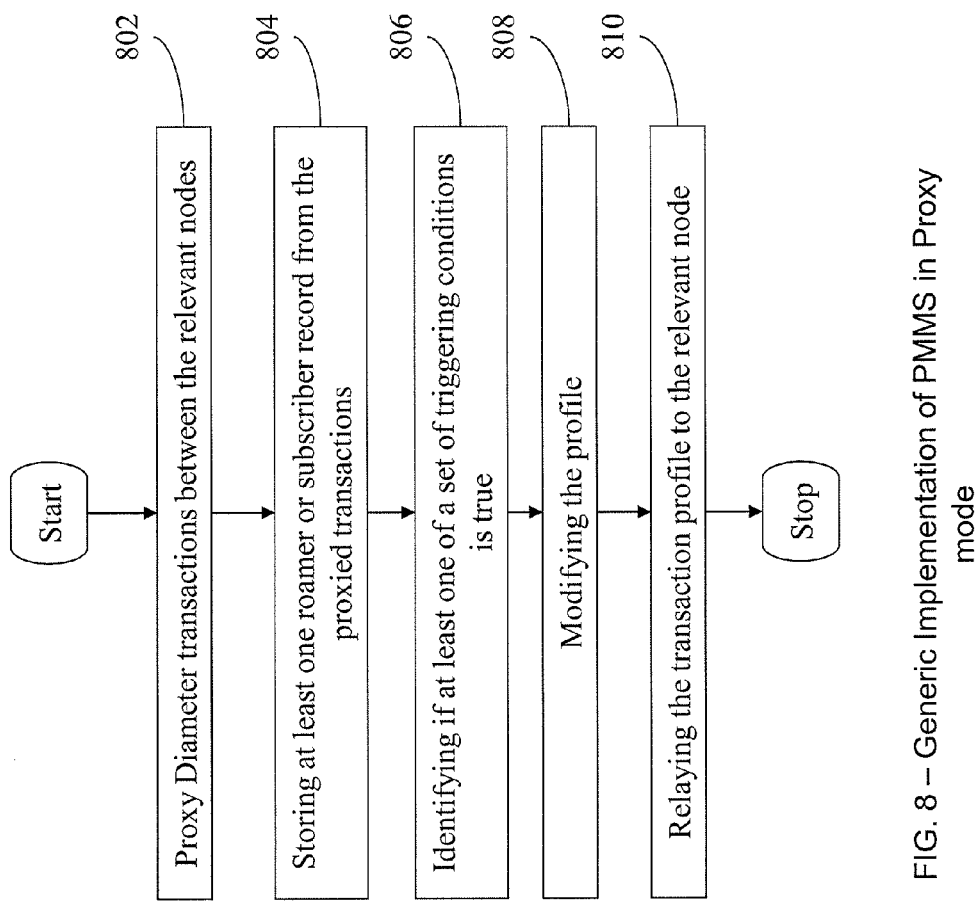
FIG. 8 – Generic Implementation of PMMS in Proxy mode

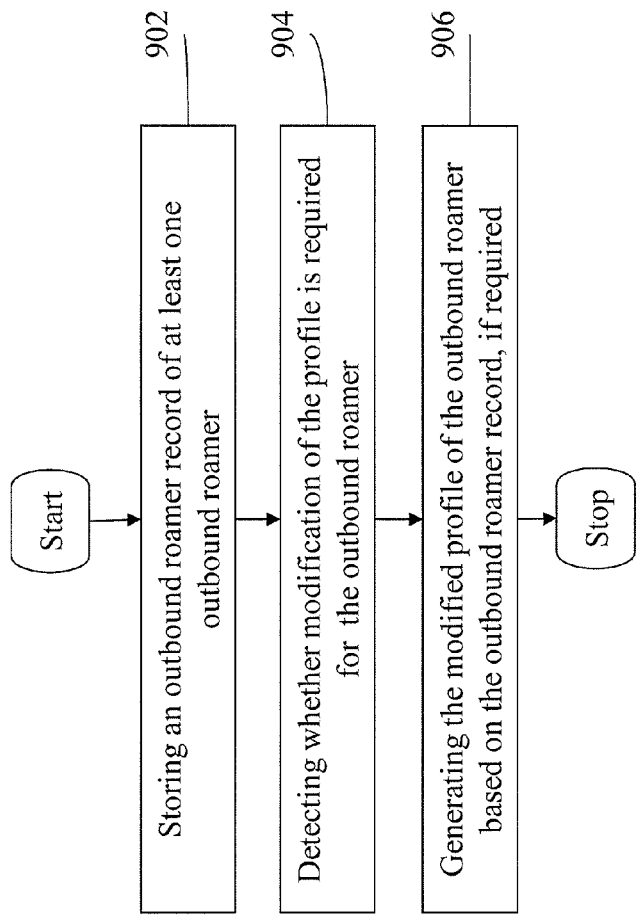
FIG. 9 - Method for monitoring-based PMMS implementation for an outbound roamer

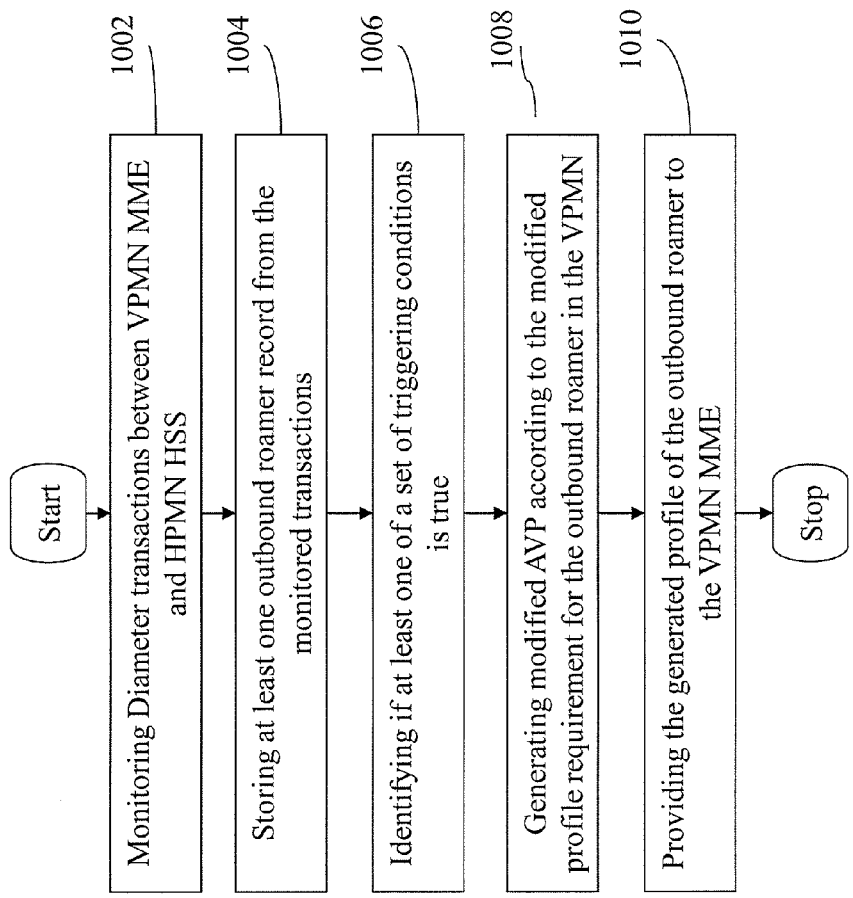
FIG. 10 Flowchart for a Profile Modification of an outbound roamer using a monitoring approach

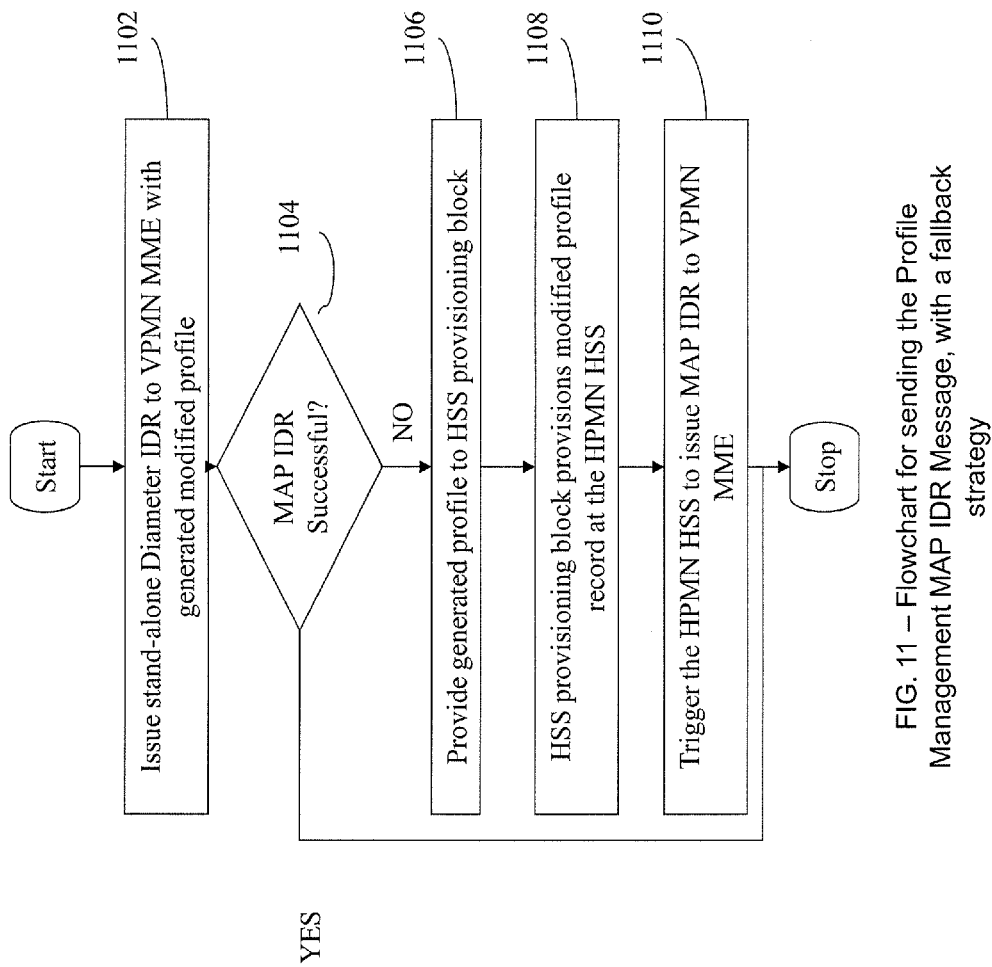
FIG. 11 – Flowchart for sending the Profile Management MAP IDR Message, with a fallback strategy

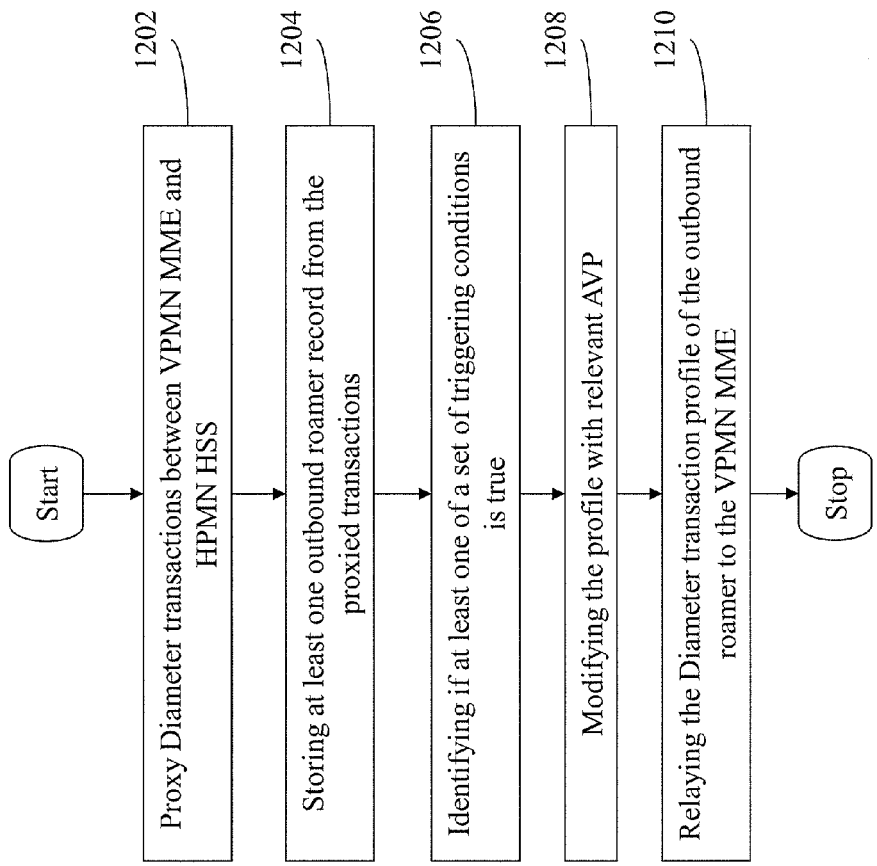
FIG. 12 – Flowchart for Profile Modification of an LTE outbound roamer using a proxy approach

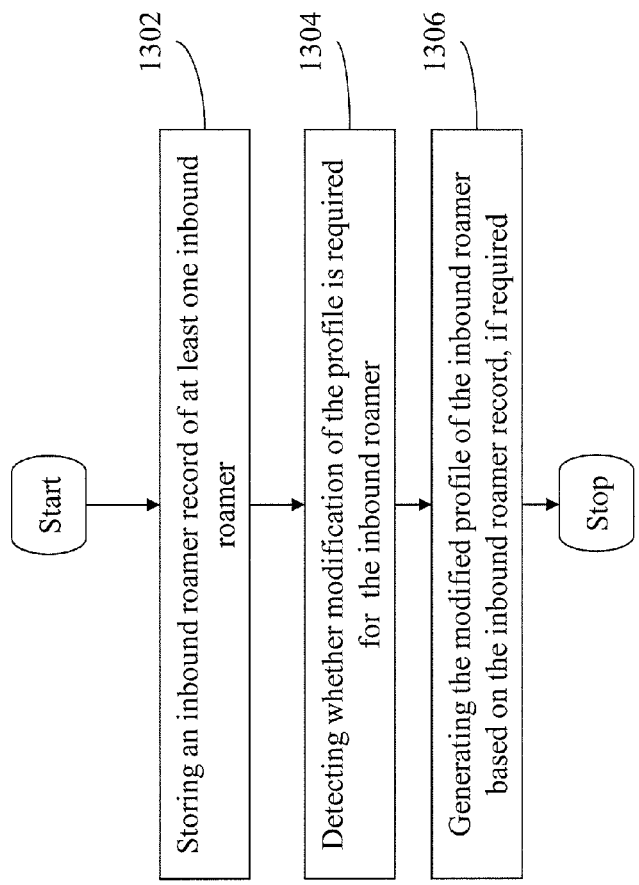
FIG. 13 - Method for monitoring-based PMMS implementation for an inbound roamer

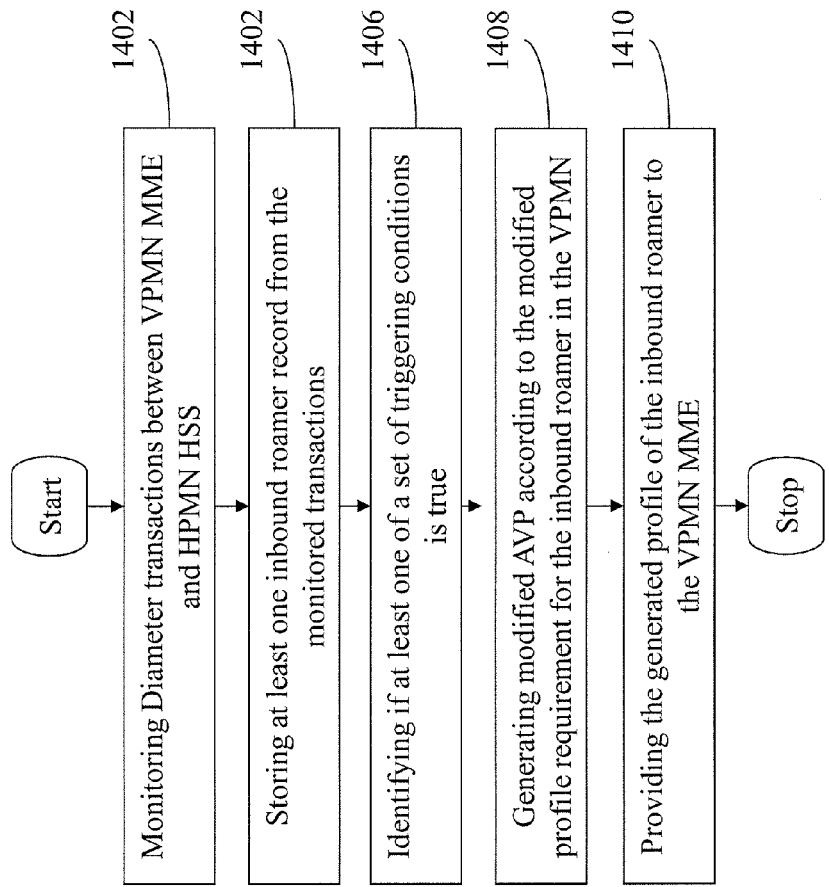
FIG. 14 Flowchart for a Profile Modification of an inbound roamer using a monitoring approach

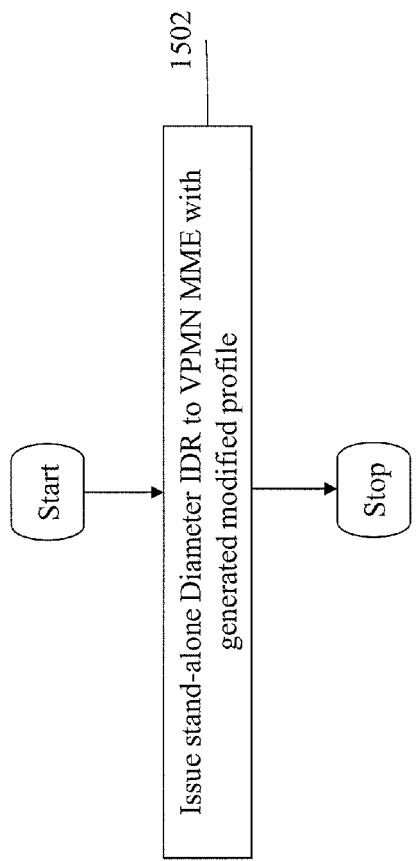
FIG. 15 – Flowchart for sending the Profile Management Diameter IDR Message

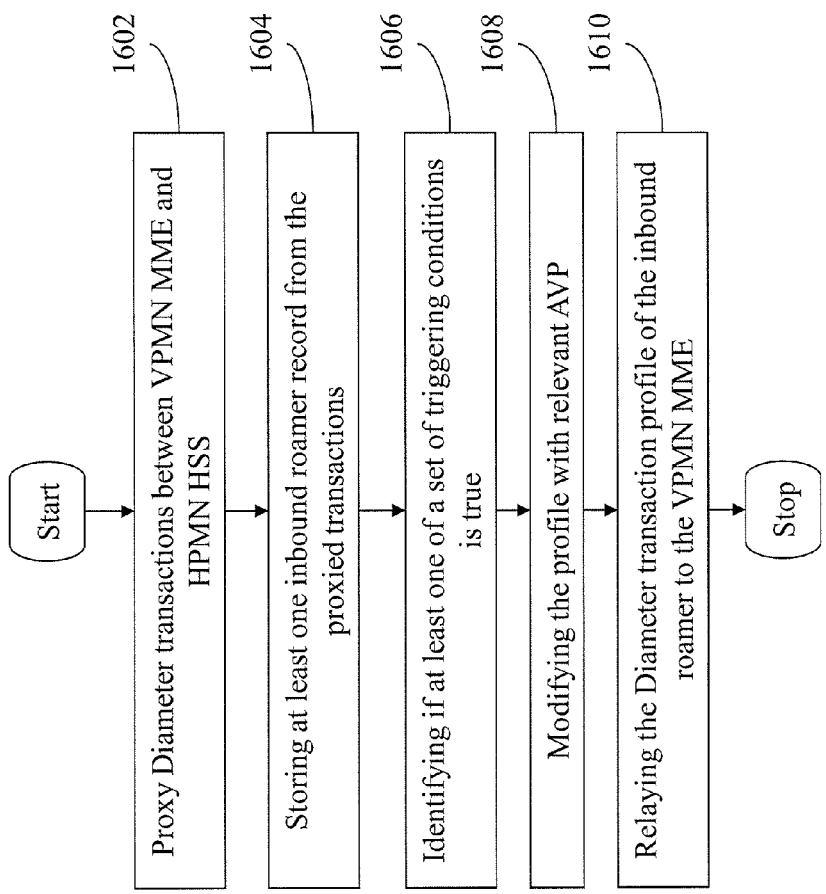
FIG. 16 – Flowchart for Profile Modification of a LTE inbound roamer using a proxy approach

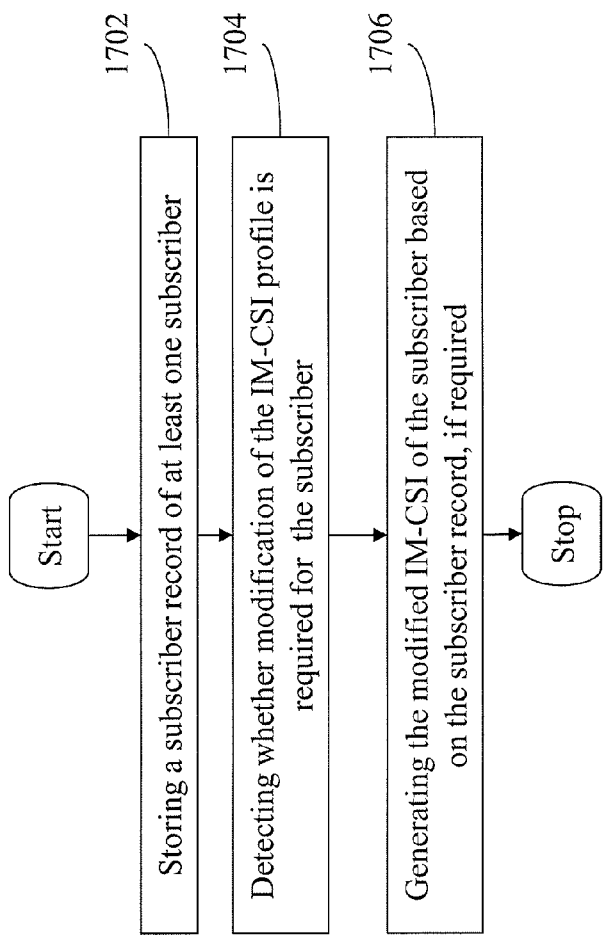
FIG. 17 - Method for monitoring-based PMMS implementation for an IMS subscriber requiring a IM-CSI modification

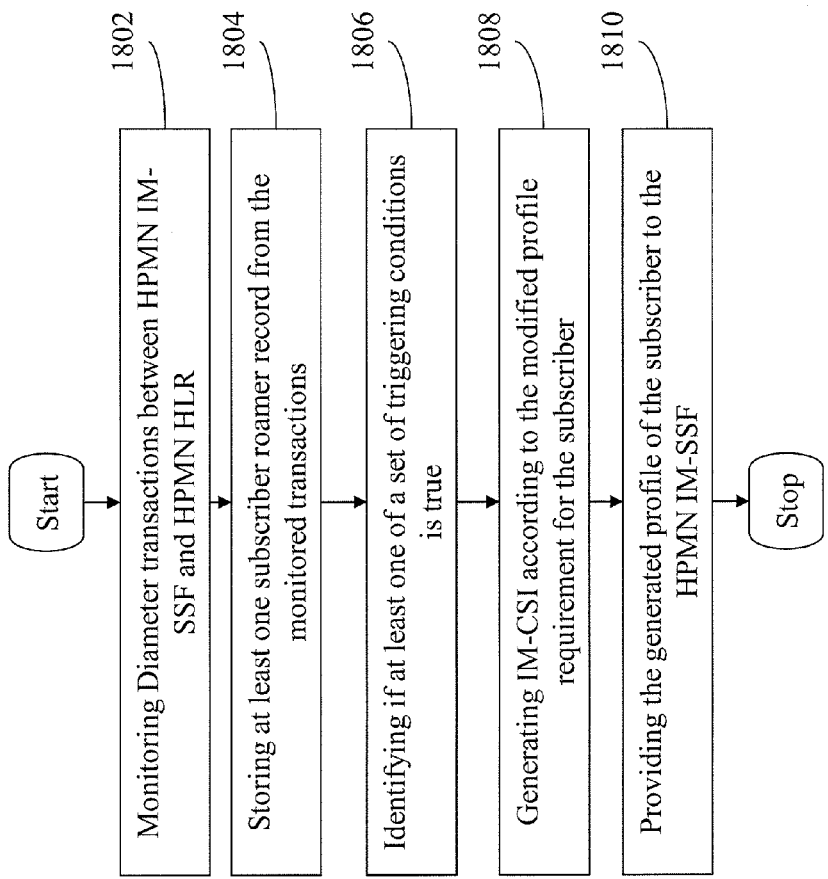
FIG. 18 Flowchart for a Profile Modification of an IMS subscriber requiring a IM-CSI modification using a monitoring approach

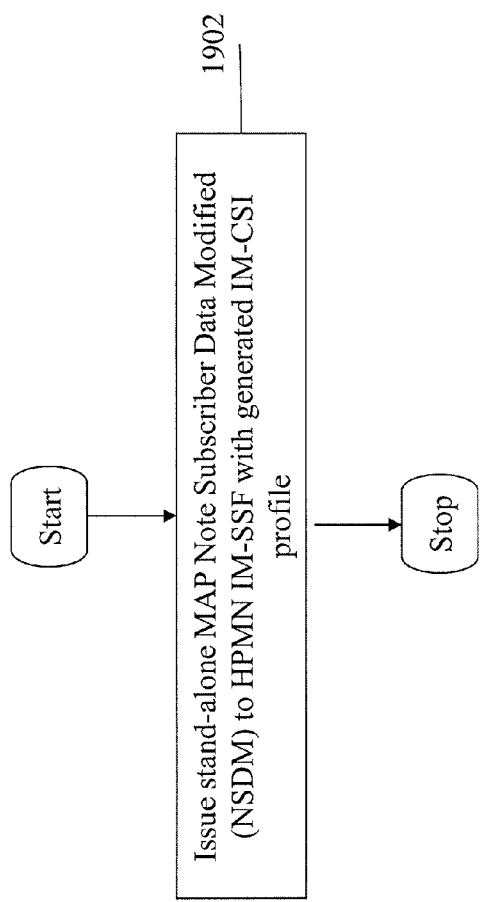
FIG. 19 – Flowchart for sending the Profile Management MAP NSDM Message

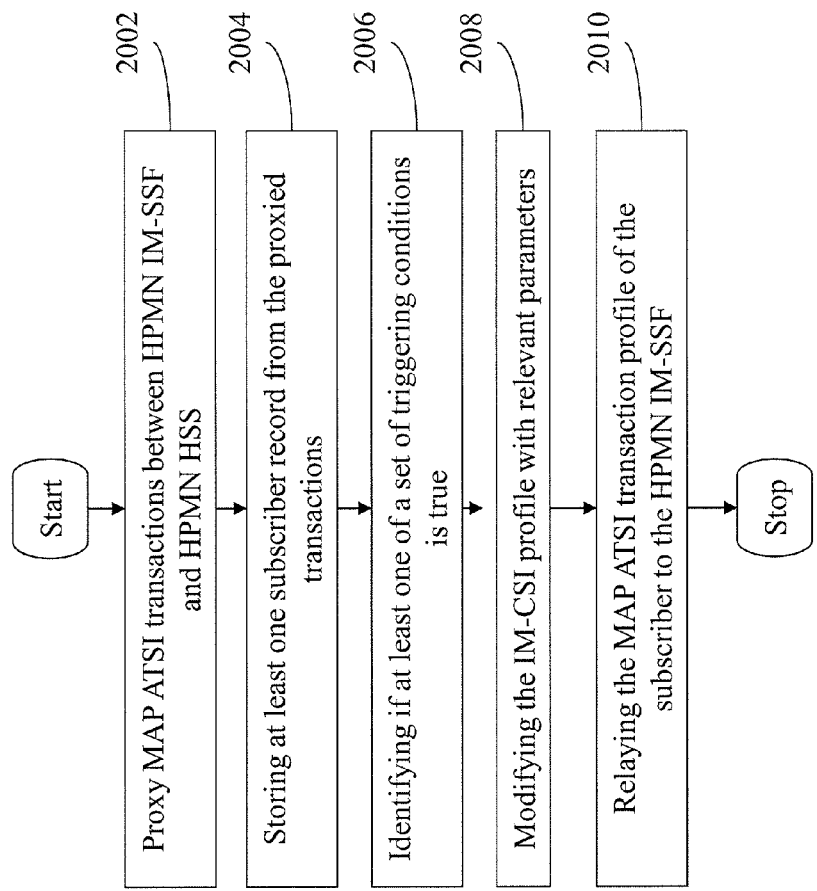
FIG. 20 – Flowchart for IM-CSI Profile Modification of a IMS subscriber using a proxy approach

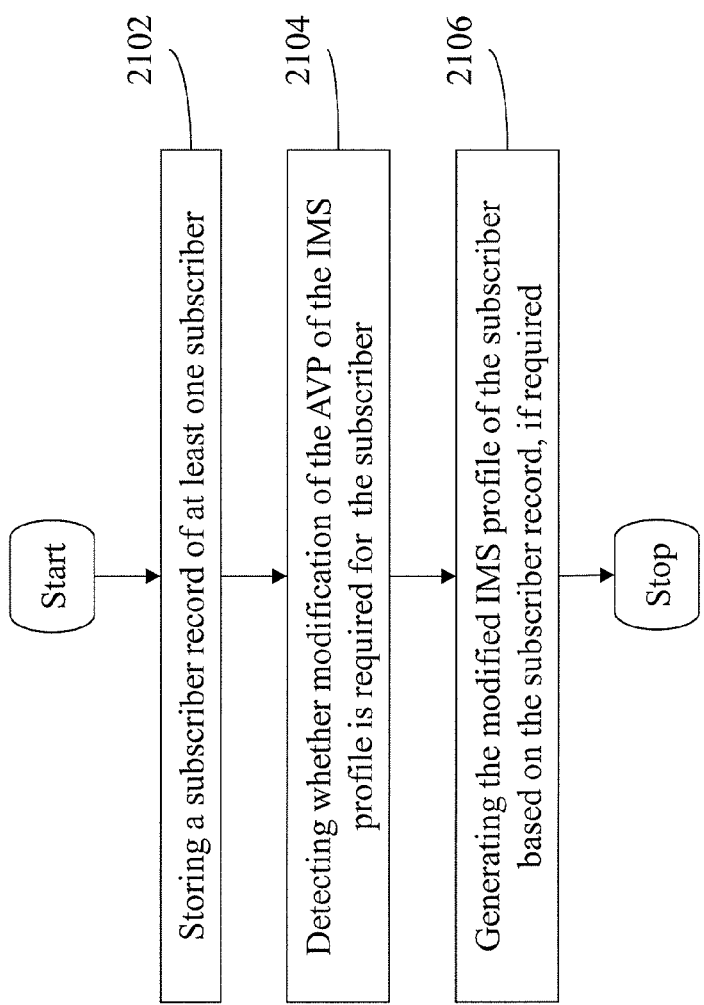
FIG. 21– Flowchart for IMS Profile Modification of a IMS subscriber using a monitoring approach

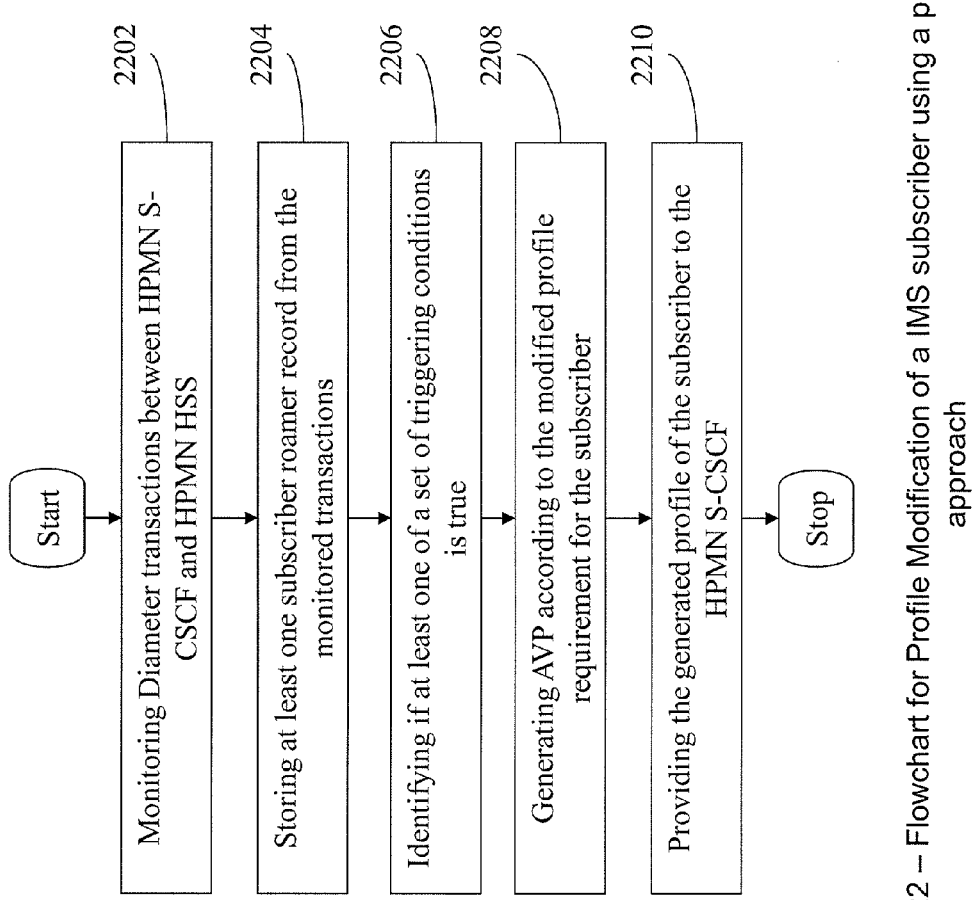
FIG. 22 – Flowchart for Profile Modification of a IMS subscriber using a proxy approach

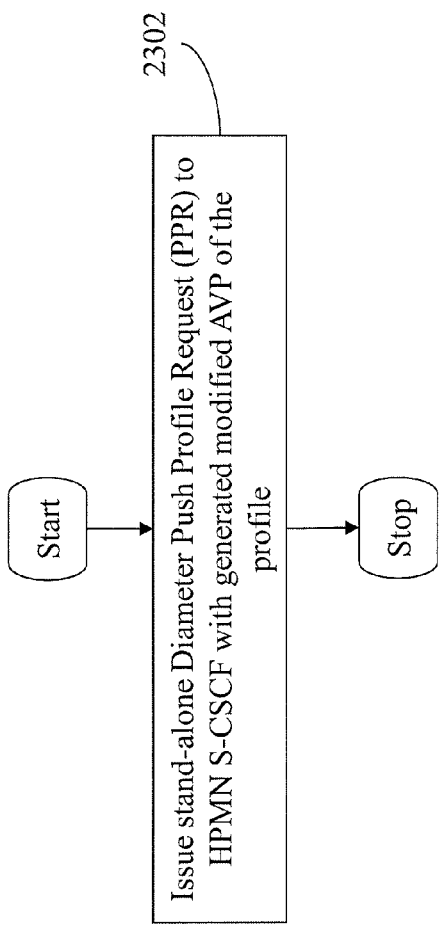
FIG. 23 – Flowchart for sending the Profile Management Diameter PPR Message

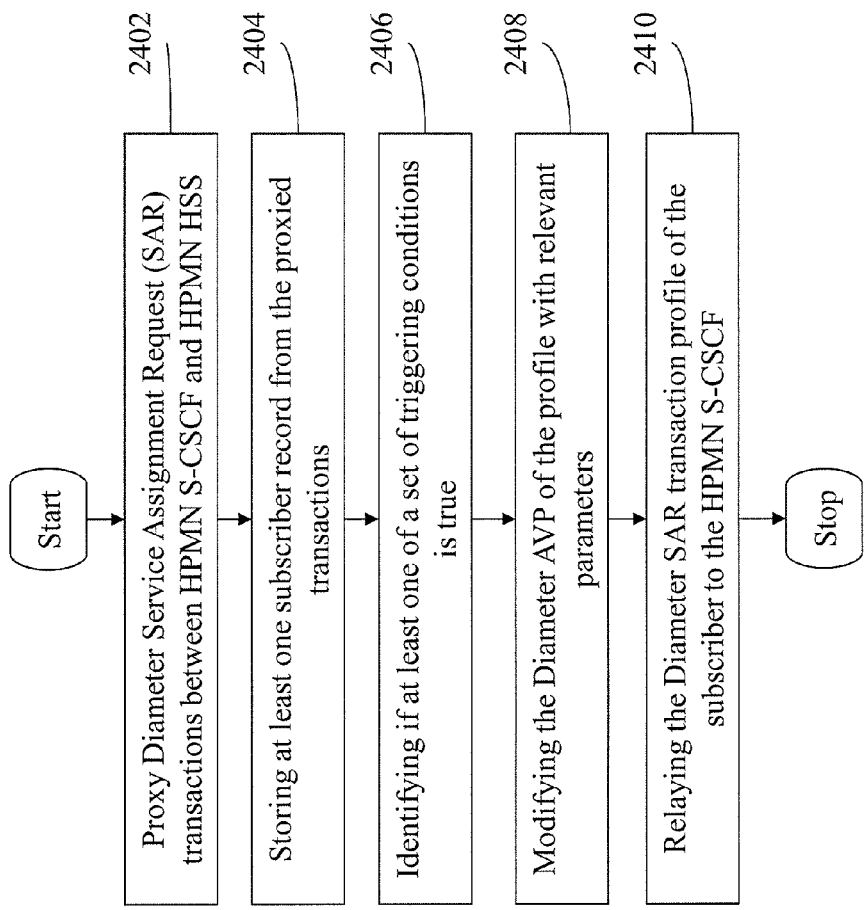
FIG. 24 – Flowchart for Profile Modification of a IMS subscriber using a proxy approach

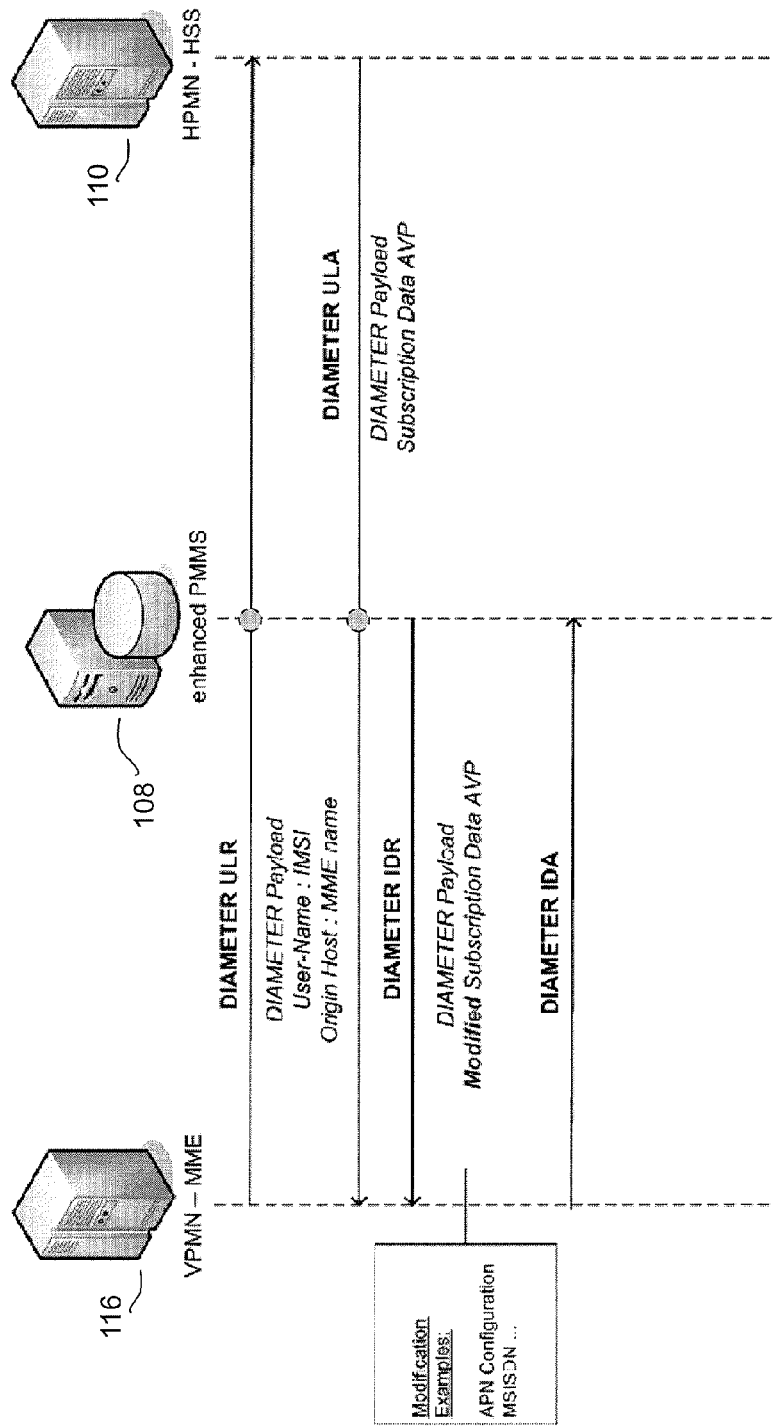
FIG 25 - Profile Modification of a roamer using a monitoring approach

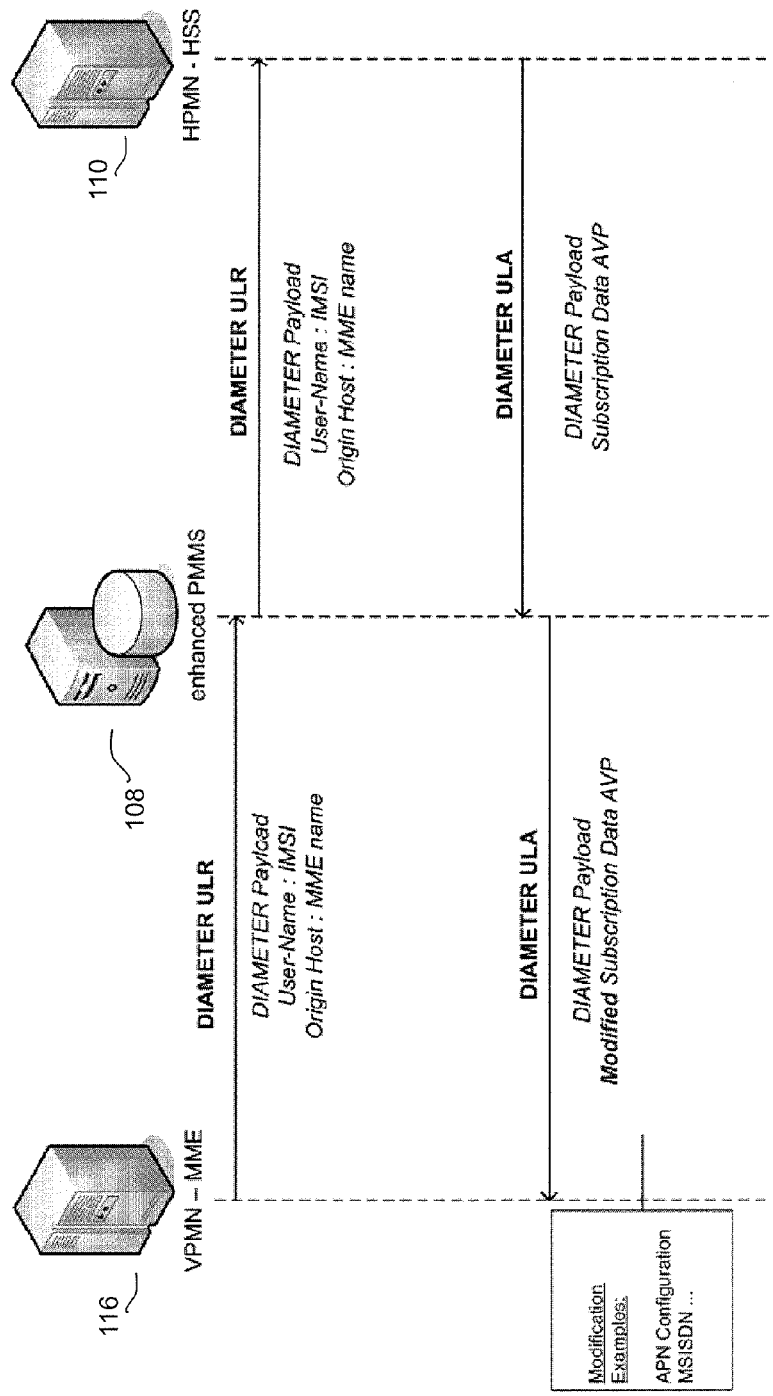
FIG 26— Profile Modification of a LTE roamer using a proxy approach

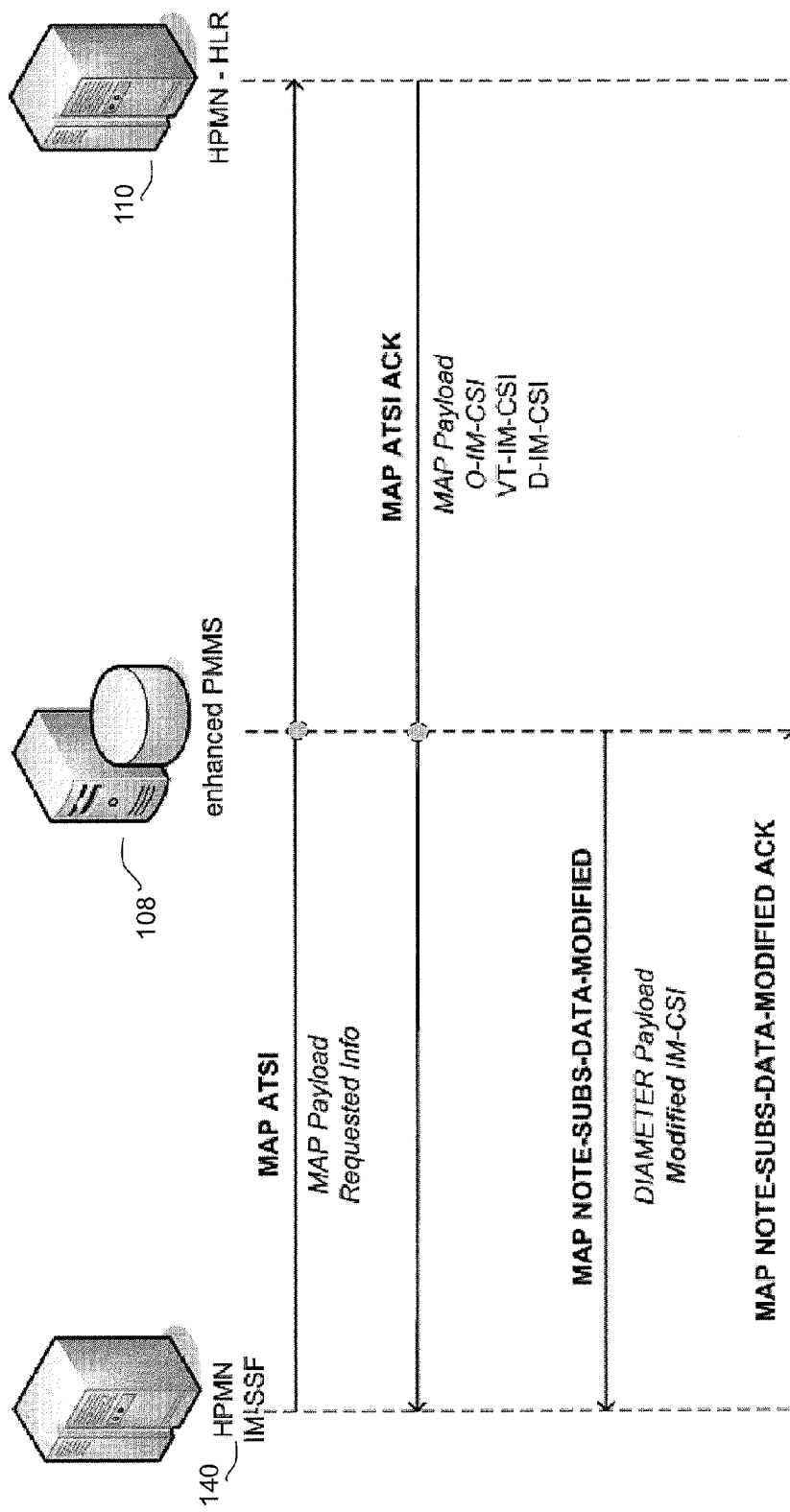
FIG 27 – IM-CSI Profile Modification of a IMS subscriber using a monitoring approach

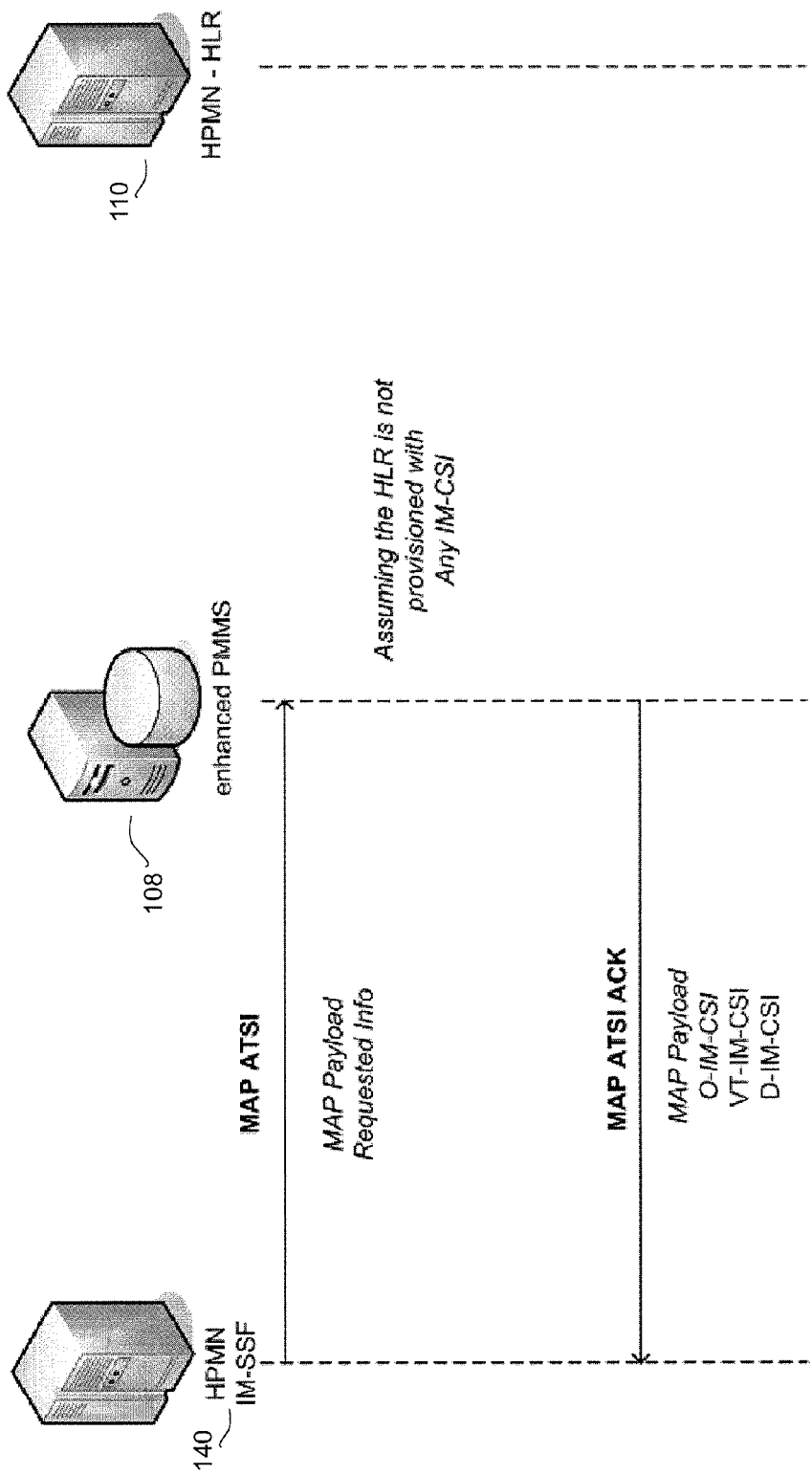
FIG 28 – IM-CSI Profile Modification of a IMS subscriber using a proxy approach

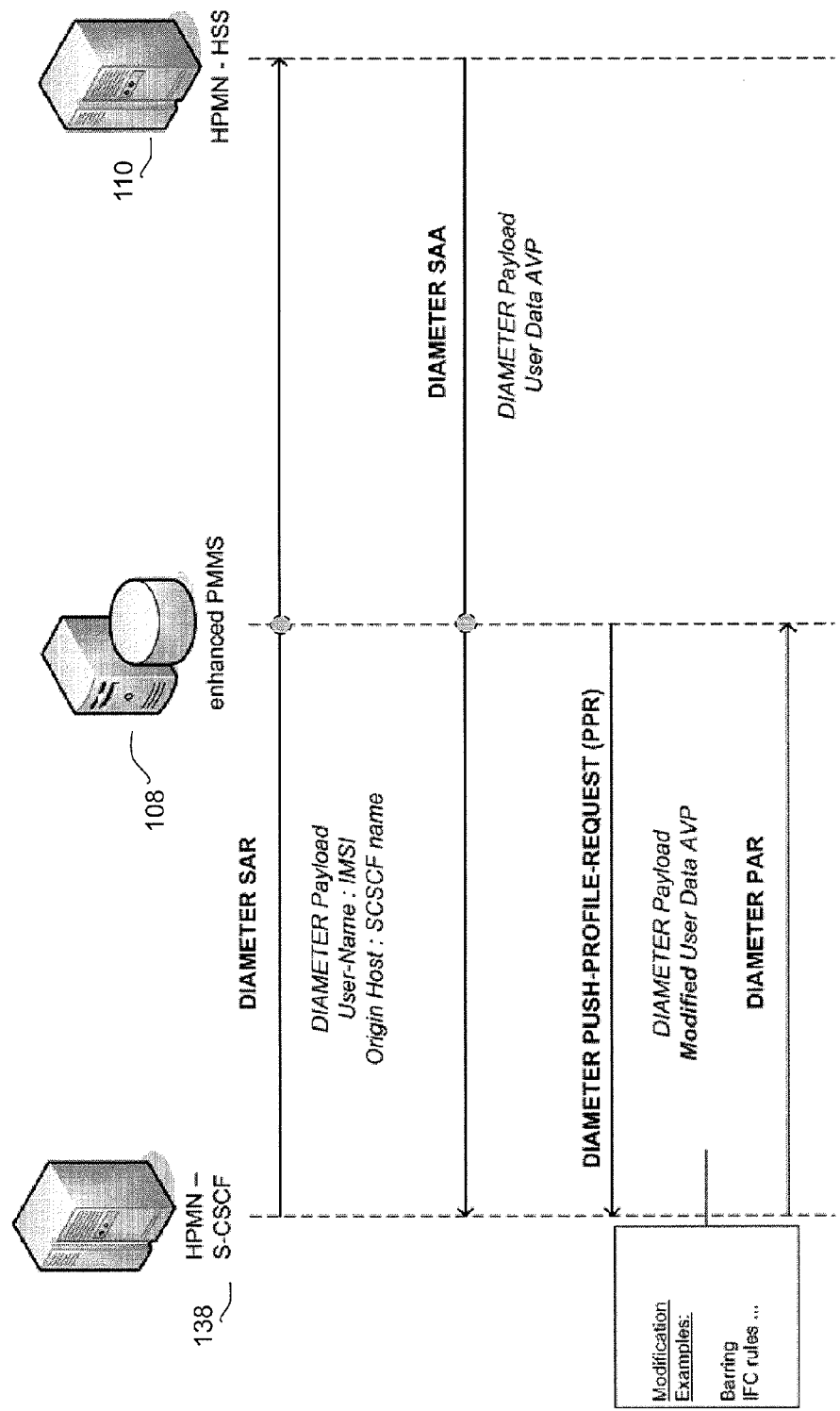
FIG 29 – Profile Modification of a IMS subscriber using a monitoring approach

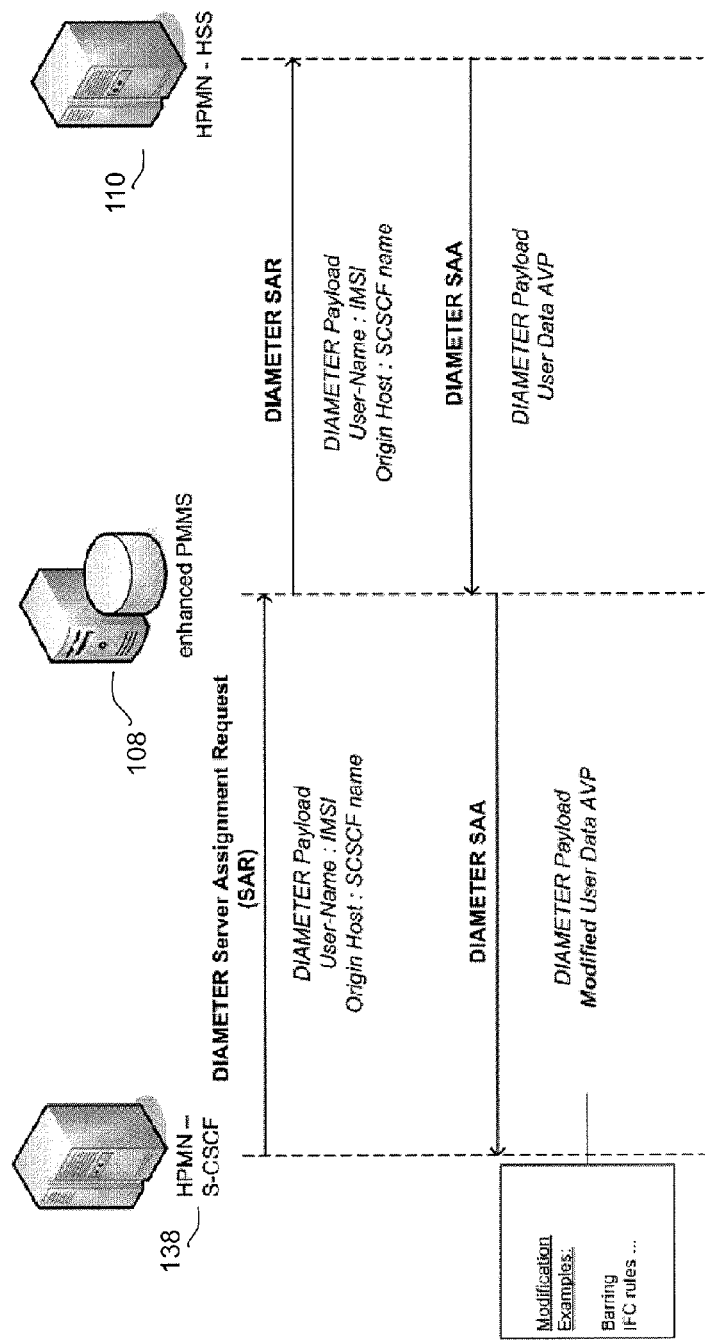
FIG 30 – Profile Modification of a IMS subscriber using a proxy approach

ENHANCED PROFILE AND MOBILITY MANAGEMENT SYSTEM (PMMS) FOR LTE ENVIRONMENT

CROSS-REFERENCE TO RELATED APPLICATIONS

This application is a National Stage entry of International Application No. PCT/US2014/013229, filed Jan. 27, 2014, which claims priority from U.S. Provisional Patent Application No. 61/756,950 entitled "LTE EVOLUTION IN DCG/PMMS" filed on Jan. 25, 2013. The disclosures of the priority applications are incorporated in their entirety herein by reference.

BACKGROUND OF THE INVENTION

Field of the Invention

The present invention generally relates to roamers. More specifically, the present invention relates to Profile and mobility management system (PMMS) for LTE environment.

With the introduction of LTE, multiple changes affect the dynamic profile management of the customers. Firstly the user profile is maintained in various nodes, depending on the required profile modification. Typically, the user profile might require adaptation in the EPC domain (MME), the IMS domain (S-CSCF) and the CAMEL interworking domain (IM-SSF).

The involvement of the different nodes depends on the purpose of the change. For example, a call barring in VoLTE may require the introduction of a TAS for handling Communication Barring (or any other supplementary services) and hence, the adjustment of the Initial Filter Criteria given in the user-data/service profile shared between the S-CSCF and the HSS upon registration.

The call barring is supported in IMS under the term Communication Barring—(ref. 3GPP 24.611). It should be noted that Barring of International Calls is a 3GPP Release 9 feature.

A MSISDN change at MME to cope with specific multi-device services or APN parameters. The use of IM-SSF function may require sending IM-CSI with adjusted parameters for specific use case (e.g. a roaming service de-coupling as planned in Europe).

In view of the above there is a requirement for a system and method for enhanced profile and mobility management system (PMMS) for LTE environment.

SUMMARY OF THE INVENTION

The present invention is directed to a system, method and computer program product for The present invention provides a system and method for providing additional or modified subscriber profile information of an outbound roamer of a Home Public Mobile Network (HPMN), wherein the outbound roamer is roaming in a Visited Public Mobile Network (VPMN) in an LTE environment. The system includes a monitoring block to monitor Diameter and MAP transaction messages on the S6, SI and Cx interface. The system further includes subscriber and roamer databases storing subscriber or roamer records, wherein the record comprises at least the International Mobile Subscriber Identity (IMSI) of the subscriber or the roamer. The system further includes detection block to detect whether provisioning of an alternate roaming profile is required for the subscriber or roamer. The system further includes a provisioning block to provision the generated alternate roaming profile of the subscriber or the roamer to LTE nodes holding a subscriber or roamer profile (i.e. MME, the IM-SSF or the SCSCF).

BRIEF DESCRIPTION OF DRAWINGS

In the drawings, the same or similar reference numbers identify similar elements or acts.

FIG. 1 illustrates a block diagram of a system for overview of possible profile modification requirements in LTE environment, in accordance with an embodiment of the present invention.

FIG. 2 illustrates a block diagram of method for Fallback to provision the HSS/HLR leading to a dynamic Profile modification at the MME, via HSS-originated signaling, dynamic CAMEL gateway, in accordance with an embodiment of the present invention.

FIG. 3 illustrates architecture for modifying profile of an outbound roamer, in accordance with an embodiment of the present invention.

FIG. 4 illustrates architecture for modifying profile of an outbound roamer, in accordance with another embodiment of the present invention.

FIG. 5 illustrates architecture for modifying profile of a roamer in LTE environment, in accordance with another embodiment of the present invention.

FIG. 6 shows an overview of enhanced PMMS in accordance with an embodiment of the invention.

FIG. 7 illustrates a flowchart for monitoring-based PMMS implementation, in accordance with an embodiment of the present invention.

FIG. 8 illustrates a flow diagram of Implementation of PMMS in Proxy mode in accordance with an embodiment of the present invention.

FIG. 9 illustrates a flow diagram monitoring-based PMMS implementation for an outbound roamer in accordance with an embodiment of the present invention.

FIG. 10 illustrates a flow diagram of Profile Modification of an outbound roamer using a monitoring approach in accordance with an embodiment of the present invention.

FIG. 11 illustrates a flow diagram of sending the Profile Management MAP IDR Message, with a fallback strategy in accordance with an embodiment of the present invention.

FIG. 12 illustrates a flow diagram for Profile Modification of an LTE outbound roamer using a proxy approach in accordance with an embodiment of the present invention.

FIG. 13 illustrates a flow diagram for monitoring-based PMMS implementation for an inbound roamer in accordance with an embodiment of the present invention.

FIG. 14 illustrates a flow diagram of Profile Modification of an inbound roamer using a monitoring approach in accordance with an embodiment of the present invention.

FIG. 15 illustrates a flow diagram of sending the Profile Management Diameter IDR Message in accordance with an embodiment of the present invention.

FIG. 16 illustrates a flow diagram of sending Profile Modification of a LTE inbound roamer using a proxy approach in accordance with an embodiment of the present invention.

FIG. 17 illustrates a flow diagram of monitoring-based PMMS implementation for an IMS subscriber requiring a IM-CSI modification in accordance with an embodiment of the present invention.

FIG. 18 illustrates a flow diagram of Profile Modification of an IMS subscriber requiring a IM-CSI modification using a monitoring approach in accordance with an embodiment of the present invention.

FIG. 19 illustrates a flow diagram of sending the Profile Management MAP NSDM Message in accordance with an embodiment of the present invention.

FIG. 20 illustrates a flow diagram for IM-CSI Profile Modification of a IMS subscriber using a proxy approach in accordance with an embodiment of the present invention.

FIG. 21 illustrates a flow diagram for IM-CSI Profile Modification of a IMS subscriber using a monitoring approach in accordance with an embodiment of the present invention.

FIG. 22 illustrates a flow diagram for Profile Modification of a IMS subscriber using a proxy approach in accordance with an embodiment of the present invention.

FIG. 23 illustrates a flow diagram for sending the Profile Management Diameter PPR Message in accordance with an embodiment of the present invention.

FIG. 24 illustrates a flow diagram for Profile Modification of a IMS subscriber using a proxy approach in accordance with an embodiment of the present invention.

FIG. 25 illustrates a flow diagram for Profile Modification of a roamer using a monitoring approach in accordance with an embodiment of the present invention.

FIG. 26 illustrates a flow diagram for Profile Modification of a LTE roamer using a proxy approach in accordance with an embodiment of the present invention.

FIG. 27 illustrates a flow diagram for IM-CSI Profile Modification of a IMS subscriber using a monitoring approach in accordance with an embodiment of the present invention.

FIG. 28 illustrates a flow diagram for IM-CSI Profile Modification of a IMS subscriber using a proxy approach in accordance with an embodiment of the present invention.

FIG. 29 Illustrates an example profile modification of a IMS subscriber using a monitoring approach.

FIG. 30 Illustrates an example profile modification of a IMS subscriber using a proxy approach.

DETAILED DESCRIPTION OF THE INVENTION

In the foregoing description, the HPMN is a network to which an inbound roamer is originally subscribed while the VPMN is a network where the inbound roamer is situated while he is roaming.

FIG. 1 illustrates a block diagram of a system for overview of possible profile modification requirements in LTE environment, in accordance with an embodiment of the present invention. The solution is based on functional blocks i.e. an optional monitoring block, a detection block, a provisioning and generation block and an optional HSS provisioning block. The use of the optional depends on the implementation mode chosen by the operator. The enhanced PMMS solution can be implemented using a monitoring approach—where the protocols are observed without any interference from the system—or a proxy approach where the messages are routed through the system.

FIG. 2 illustrates a block diagram of method for Fallback to provision the HSS/HLR leading to a dynamic Profile modification at the MME, via HSS-originated signaling, dynamic CAMEL gateway, in accordance with an embodiment of the present invention.

FIG. 3 illustrates architecture for modifying profile of an outbound roamer in accordance with an embodiment of the present invention. The system comprises VPMN 102 communicating with HPMN 104 via a SS7 interface 106. VPMN 102 comprises a monitoring block 108 coupled to a dynamic CAMEL gateway 110, a VPMN GMSC/STP 112, and a VPMN VLR/VMSC 114. Dynamic CAMEL gateway 110 and VPMN VLR/VMSC 114 are coupled to VPMN GMSC/STP 112. HPMN 104 comprises a HPMN STP 116 and a HPMN HLR 118. VPMN GMSC/STP 112 communicates with HPMN STP 116 via SS7 interface 106. HPMN HLR 118 is coupled to HPMN STP 116. In accordance with an embodiment of the present invention, gsmSSF may be integrated with VPMN VLR/VMSC 114. Although the system is described using essential components, however, it will be obvious to a person skilled in the art that the system includes various other components not shown in the figure, for the purpose of clarity.

In an embodiment of the present invention, the interface between monitoring block 108 and dynamic CAMEL gateway 110 may be a TCP/IP based interface. Monitoring block 108 and dynamic CAMEL gateway 110 may belong to different vendors. However, monitoring block 108 and dynamic CAMEL gateway 110 may belong to a same vendor.

In accordance with an embodiment of the present invention, monitoring block 108 and dynamic CAMEL gateway 110 may be physically integrated in the same box. In accordance with another embodiment of the present invention, monitoring block 108 and dynamic CAMEL gateway 110 may be installed separately.

VPMN VLR/VMSC 114 sends a MAP transaction message 120 to HPMN HLR 118 when an inbound roamer registers at VPMN VLR/VMSC 114. MAP transaction message 120 includes a MAP Location Update transaction. Monitoring block 108 taps international roaming links employed by SS7 interface 106 and used for sending MAP transaction message 120. Monitoring block 108 monitors MAP transaction message 120 and informs dynamic CAMEL gateway 110 when it detects a successful MAP Location Update. In accordance with an embodiment of the present invention, the monitoring may be in the path of signaling. In accordance with another embodiment of the present invention, monitoring may be non-intrusive. Further, monitoring block 108 provides details of the inbound roamer to dynamic CAMEL gateway 110. The details provided by monitoring block 108 include at least one of an International Mobile Subscriber Identity (IMSI), the HPMN HLR, the VPMN VLR/VMSC, a Mobile Station International ISDN Number (MSISDN), a supported CAMEL phase by the HPMN, all CSIs (for example, O-CSI, SS-CSI, VT-CSI and the like) and combination thereof.

If the details do not contain a MO-CSI, dynamic CAMEL gateway 110 generates the MO-CSI of the inbound roamer. In accordance with an embodiment of the present invention, the MO-CSI comprises a service key and an address of a Global System for Mobile communication Service Control Function (gsmSCF). The gsmSCF address may be the address of dynamic CAMEL gateway 110 or an existing gsmSCF of VPMN 102. Dynamic CAMEL gateway 110 provides the generated MO-CSI to VPMN VLR/VMSC 114 via VPMN GMSC/STP 112. Dynamic CAMEL gateway 110 maintains records relating to at least one HPMN, CAMEL phases supported by the HPMN, and at least one inbound roamer details.

FIG. 4 illustrates architecture for modifying profile of an outbound roamer, in accordance with another embodiment of the present invention.

FIG. 5 illustrates architecture for modifying profile of a roamer in LTE environment, in accordance with another embodiment of the present invention.

FIG. 6 shows an overview of enhanced PMMS in accordance with an embodiment of the invention. The following call flows show how the system is implemented for modifying the profile of a subscriber roaming in LTE or using the IMS service.

FIG. 7 illustrates a flowchart for monitoring-based PMMS implementation, in accordance with an embodiment of the present invention.

FIG. 8 illustrates a flow diagram of Implementation of PMMS in Proxy mode in accordance with an embodiment of the present invention.

FIG. 9 illustrates a flow diagram monitoring-based PMMS implementation for an outbound roamer in accordance with an embodiment of the present invention.

FIG. 10 illustrates a flow diagram of Profile Modification of an outbound roamer using a monitoring approach in accordance with an embodiment of the present invention.

FIG. 11 illustrates a flow diagram of sending the Profile Management MAP IDR Message, with a fallback strategy in accordance with an embodiment of the present invention.

FIG. 12 illustrates a flow diagram for Profile Modification of an LTE outbound roamer using a proxy approach in accordance with an embodiment of the present invention.

FIG. 13 illustrates a flow diagram for monitoring-based PMMS implementation for an inbound roamer in accordance with an embodiment of the present invention.

FIG. 14 illustrates a flow diagram of Profile Modification of an inbound roamer using a monitoring approach in accordance with an embodiment of the present invention.

FIG. 15 illustrates a flow diagram of sending the Profile Management Diameter IDR Message in accordance with an embodiment of the present invention.

FIG. 16 illustrates a flow diagram of sending Profile Modification of a LTE inbound roamer using a proxy approach in accordance with an embodiment of the present invention.

FIG. 17 illustrates a flow diagram of monitoring-based PMMS implementation for an IMS subscriber requiring a IM-CSI modification in accordance with an embodiment of the present invention.

FIG. 18 illustrates a flow diagram of Profile Modification of an IMS subscriber requiring a IM-CSI modification using a monitoring approach in accordance with an embodiment of the present invention.

FIG. 19 illustrates a flow diagram of sending the Profile Management MAP NSDM Message in accordance with an embodiment of the present invention.

FIG. 20 illustrates a flow diagram for IM-CSI Profile Modification of a IMS subscriber using a proxy approach in accordance with an embodiment of the present invention.

FIG. 21 illustrates a flow diagram for IM-CSI Profile Modification of a IMS subscriber using a monitoring approach in accordance with an embodiment of the present invention.

FIG. 22 illustrates a flow diagram for Profile Modification of a IMS subscriber using a proxy approach in accordance with an embodiment of the present invention.

FIG. 23 illustrates a flow diagram for sending the Profile Management Diameter PPR Message in accordance with an embodiment of the present invention.

FIG. 24 illustrates a flow diagram for Profile Modification of a IMS subscriber using a proxy approach in accordance with an embodiment of the present invention.

FIG. 25 illustrates a flow diagram for Profile Modification of a roamer using a monitoring approach in accordance with an embodiment of the present invention. The PMMS monitors using in-signaling techniques the diameter message to modify the message.

FIG. 26 illustrates a flow diagram for Profile Modification of a LTE roamer using a proxy approach in accordance with an embodiment of the present invention. The PMMS monitors using in-path techniques the diameter message to modify the message.

FIG. 27 illustrates a flow diagram for IM-CSI Profile Modification of a IMS subscriber using a monitoring approach in accordance with an embodiment of the present invention. In this case, the PMMS module uses in-signaling technique to tap the MAP ATSI message to modify it.

FIG. 28 illustrates a flow diagram for IM-CSI Profile Modification of a IMS subscriber using a proxy approach in accordance with an embodiment of the present invention. In this case, the PMMS module uses in path technique to receive MAP ATSI message assuming HLR is not provisioned with any IM-CSI.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the CCSIR is not intended to be exhaustive or to limit the CCSIR to the precise form disclosed. While specific embodiments of, and examples for, the CCSIR are described herein for illustrative purposes, various equivalent modifications are possible within the scope of the CCSIR, as those skilled in the art will recognize. The teachings of the CCSIR provided herein may be applied to other processing systems and methods. They may not be limited to the systems and methods described above.

The elements and acts of the various embodiments described above may be combined to provide further embodiments. These and other changes may be made to the CCSIR in light of the above detailed description.

Other Variations

Provided above for the edification of those of ordinary skill in the art, and not as a limitation on the scope of the invention, are detailed illustrations of a scheme for generating and provisioning the CSI of an inbound roamer in a wireless communication network, who has moved onto a VPMN and is detected as being registering with the VPMN. Numerous variations and modifications within the spirit of the present invention will of course occur to those of ordinary skill in the art in view of the embodiments that have now been disclosed. For example, while in the described embodiments, the present invention is implemented primarily from the point of view of GSM mobile networks, the present invention may also be effectively implemented on CDMA, 3G, WCDMA, GPRS, etc., or any other network of common carrier telecommunications in which end users are normally configured to operate within a "home" network to which they normally subscribe, but have the capability of also operating on other neighboring networks.

The examples under the present invention, detailed in the illustrative examples contained here, are described using terms and constructs drawn largely from GSM mobile telephony infrastructure. However, use of these examples should not be interpreted to limiting the invention to those media. The capabilities of the visited or non-accustomed network may be of use and provided through any type of telecommunications medium, including without limitation: (i) any mobile telephony network including, without limitation, GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink, or telecommunications equipment meant for voice over IP communications such as those provided by Vonage or Packet8.

In describing certain embodiments of dynamic CSI generation under the present invention, this specification follows the path of a telecommunications call from a calling party to a called party. For the avoidance of doubt, that call may be for a normal voice call, in which the subscriber telecommunications equipment is also capable of visual, audiovisual or motion-picture display. Alternatively, those devices or calls may be for text, video, pictures or other communicated data.

TECHNICAL REFERENCES, THE ENTIRETY OF EACH OF WHICH IS INCORPORATED BY REFERENCE HEREIN

GSM 902 on MAP specification
GSM 340 on SMS
GSM 378 on CAMEL
GSM 978 on CAMEL Application Protocol
GSM 379 on CAMEL Support of Optimal Routing (SOR)
GSM 318 on CAMEL Basic Call Handling
ITU-T Recommendation Q.1214 (1995), Distributed functional plane for intelligent network CS-1.
ITU-T Recommendation Q.1218 (1995), Interface Recommendation for intelligent network CS-1.
ITU-T Recommendation Q.762 (1999), Signaling system No. 7—ISDN user part general functions of messages and signals.
ITU-T Recommendation Q.763 (1999), Signaling system No. 7—ISDN user part formats and codes.
ITU-T Recommendation Q.764 (1999), Signaling system No. 7—ISDN user part signaling procedures.
ITU-T Recommendation Q.766 (1993), Performance objectives in the integrated services digital network application.
ITU-T Recommendation Q.765 (1998), Signaling system No. 7—Application transport mechanism.
ITU-T Recommendation Q.769.1 (1999), Signaling system No. 7—ISDN user part enhancements for the support of Number Portability.

APPENDIX

| Acronym | Description |
|---|---|
| BCD | Binary Coded Decimal |
| CAP | CAMEL Application Part |
| CAMEL | Customized Applications for Mobile network Enhanced Logic |
| CB | Call Barring |
| CC | Country Code |
| CLI | Calling Line Identification |
| CON | IN/CAMEL Connect |
| CSI | CAMEL Subscription Information |
| CUE | IN/CAMEL Continue |
| DPC | Destination Point Code |
| ERB | Event Report Basic call state machine |
| FCI | Furnish Charging Information |
| GGSN | Gateway GPRS Support Node |
| GMSC-H | HPMN Gateway MSC |
| GPRS | General Packet Radio Service |
| GPRS-CSI | GPRS CSI |
| gsmSCF | GSM service control function |
| gsmSSF | GSM service switch function |
| HLR | Home Location Register |
| HLR-H | HLR from HPMN |
| HPMN | Home Public Mobile Network |
| IDP | Initial Detection Point IN/CAP message |
| IMSI | International Mobile Subscriber Identifier |
| IN | Intelligent Network |
| ISD | Insert Subscriber Data |
| ISUP | ISDN User Part |
| LUP | MAP Location Update |
| MAP | Mobile Application Part |
| ME | Mobile Equipment |
| MNC | Mobile Network Code |
| MSC | Mobile Switch Center |
| MSISDN | Mobile Subscriber ISDN |
| MSRN | Mobile Station Roaming Number |
| NDC | National Destination Code |
| O-CSI | Originating CSI |
| ODB | Operator Determined Barring |
| PLN | Prepaid Local Number |
| RRB | Request Report Basic call state machine |
| SCCP | Signal Connection Control Part |
| SCP | Service Control Point |
| SGSN | Service GPRS Support Node |
| SPC | Signal Point Code |
| SRI | Send Routing Information |
| SRI-SM | Send Routing Information for Short Message |
| SS7 | Signaling System 7 |
| SS-CSI | Supplementary Service CSI |
| STP | Signal Transfer Point |
| STP-H | HPMN STP |
| T-CSI | Terminating CSI |
| USSD | Unstructured Supplementary Service Data |
| VLR | Visited Location Register |
| VLR-V | VLR from VPMN |
| VMSC | Visited Mobile Switch Center |
| VMSC-V | VMSC from VPMN |
| VPMN | Visited Public Mobile Network |
| VT-CSI | Visiting network Terminating CSI |

What is claimed is:

1. A system for providing additional or modified subscriber profile information of an outbound roamer of a Home Public Mobile Network (HPMN), wherein the outbound roamer is roaming in a Visited Public Mobile Network (VPMN) in a Long Term Evolution (LTE) environment, the system comprising:
- a monitoring block to monitor Diameter and MAP transaction messages on one of the S6, SI and Cx interfaces;
- a database storing roamer records, wherein each record comprises at least an International Mobile Subscriber Identity (IMSI) of the roamer;
- a detection block to detect whether provisioning of an alternate roaming profile is required for the roamer by at least identifying whether a Diameter attribute-value pairs (AVP) defining an expected profile of the roamer is passed to a mobility management entity (MME) in the VPMN in an original successful response indicated by a Diameter update location answer (ULA) received from a home subscriber system (HSS) upon receipt of a Diameter update location request (ULR); and
- a provisioning block to provision the alternate roaming profile of the roamer to an LTE node holding a roamer profile.

2. The system of claim 1, wherein the monitoring block is configured to monitor Diameter S6 transaction messages between the MME in the VPMN and the HSS of the HPMN and store at least the IMSI of the outbound roamer in the database.

3. The system of claim 2, wherein the Diameter S6 transaction messages are selected from a group consisting of a Diameter ULR and an ULA.

4. The system of claim 3, wherein the monitoring block is communicatively coupled with the database.

5. The system of claim 1, wherein the provisioning block is configured to send a Diameter Insert Subscriber Data Request (IDR) with a modified profile AVP.

6. The system of claim 5, wherein the Diameter IDR is issued using the IMSI of the roamer.

7. The system of claim 1, further comprising an HSS provisioning block configured to receive a profile modification request.

8. The system of claim 7, wherein the HSS provisioning block is further configured to trigger the HSS of the HPMN to send a stand-alone Diameter IDR to provision a modified profile to the MME of the VPMN.

9. The system of claim 8, wherein the HSS provisioning block is configured to de-provision the modified profile at the HLR of the HPMN when at least one of the following occurs:
  a. the roamer returns to the HPMN;
  b. a roaming state of the roamer is timed out by the HPMN; and
  c. a record of the roamer at the VLR is purged by the VPMN.

10. A method for providing additional or modified subscriber profile information of a subscriber or roamer of a Home Public Mobile Network (HPMN), wherein the roamer is in a Long Term Evolution (LTE) environment, the method comprising:
- monitoring, via a processor, Diameter and MAP transaction messages on one of S6, SI and Cx interfaces;
- storing roamer records in a database, wherein each record comprises at least the International Mobile Subscriber Identity (IMSI) of the roamer;
- detecting whether provisioning of an alternate roaming profile is required for the roamer by at least identifying whether a Diameter attribute-value pairs (AVP) defining an expected profile of the roamer is passed to a mobility management entity (MME) in the VPMN in an original successful response indicated by a Diameter update location answer (ULA) received from a home subscriber system (HSS) upon receipt of a Diameter update location request (ULR); and
- provisioning the alternate roaming profile of the roamer to an LTE node holding a roamer profile.

11. The method of claim 10, further comprising:
- relaying Diameter Cx transaction messages between a S-CSCF and the HSS and storing at least the IMSI of the subscriber in the database.

12. The method of claim 10, wherein the Diameter messages are selected from a group consisting of a Diameter Server Assignment Request (SAR) and a Server Assignment Answer (SAA).

13. The method of claim 10, wherein the detecting is further based on the Diameter AVP defining the expected profile of the roamer that is passed to a SCSCF in an original successful response (SAA) coming from the HSS upon receipt of the SAR.

14. The method of claim 10, further comprising modifying the profile based on changing a Diameter Server Assignment Answer (SAA) content with a modified profile AVP, when relaying it to the S-CSCF.

15. A system for providing additional or modified subscriber profile information of an outbound roamer of a Home Public Mobile Network (HPMN), wherein the roamer is roaming in a Visited Public Mobile Network (VPMN) in a Long Term Evolution (LTE) environment, the system comprising:
- a message proxy block to relay Diameter transaction messages between a VPMN VLR/VMSC and a Home Subscriber System (HSS) of the HPMN on an S6interface;
- a database storing a roamer record of at least one roamer, wherein the roamer record comprises at least the International Mobile Subscriber Identity (IMSI) of the roamer;
- a detection block to detect whether provisioning of an alternate roaming profile is required for the roamer by at least identifying whether a Diameter attribute-value pairs (AVP) defining an expected profile of the roamer is passed to a mobility management entity (MME) in the VPMN in an original successful response indicated by a Diameter update location answer (ULA) received from the HSS upon receipt of a Diameter update location request (ULR); and
- a provisioning block to provision the alternate roaming profile of the roamer to MME.

16. The system of claim 15, further comprising:
- a proxy block to relay Diameter S6 transaction messages between the MME in the VPMN and the HSS and store at least the IMSI of the roamer in the database.

17. The system of claim 15, wherein the Diameter messages are selected from a group consisting of a Diameter ULR and an (ULA).

18. The system of claim 15, wherein the proxy block is configured to modify the Diameter ULA content with modified profile AVP when relaying it to the MME.

* * * * *